(12) United States Patent
Hoepfner

(10) Patent No.: US 8,290,460 B2
(45) Date of Patent: Oct. 16, 2012

(54) METHODS FOR MEASURING RECEIVED SIGNAL STRENGTH INDICATION, MEASUREMENT DEVICES, AND RADIO COMMUNICATION DEVICE

(75) Inventor: Marcus Hoepfner, Nuremberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 545 days.

(21) Appl. No.: 12/492,193

(22) Filed: Jun. 26, 2009

(65) Prior Publication Data
US 2010/0330943 A1    Dec. 30, 2010

(51) Int. Cl.
*H04B 17/00*    (2006.01)
*H04K 3/00*    (2006.01)
(52) U.S. Cl. .................. 455/226.2; 455/437; 455/525
(58) Field of Classification Search ............... 455/226.2, 455/436–437, 442–443, 525
See application file for complete search history.

(56) References Cited

U.S. PATENT DOCUMENTS
| | | | |
|---|---|---|---|
| 5,267,261 A | 11/1993 | Blakeney, II et al. | |
| 7,359,355 B2 | 4/2008 | Faerber | |
| 2004/0043796 A1 | 3/2004 | Aubauer et al. | |
| 2007/0037601 A1 | 2/2007 | Mittal et al. | |
| 2009/0232098 A1* | 9/2009 | Makabe | 370/332 |

FOREIGN PATENT DOCUMENTS
| | | |
|---|---|---|
| EP | 1258163 B1 | 10/2008 |
| WO | 2007022127 A2 | 2/2007 |

OTHER PUBLICATIONS

3GPP TS 25.215, V6.1.0, 3rd Generation Partnership Project, Technical Specification Group Radio Access Network, Physical layer—Measurements (FDD), Release 6, Dec. 2004, pp. 1-18.

* cited by examiner

*Primary Examiner* — Lee Nguyen

(57) ABSTRACT

In various embodiments, a method for measuring Received Signal Strength Indication is provided. The method may include carrying out a first partial Received Signal Strength Indication measurement for a plurality of mobile radio base stations, selecting at least one mobile radio base station out of the plurality of mobile radio base stations based on the result of the first partial Received Signal Strength Indication measurement for a second partial Received Signal Strength Indication measurement, and carrying out the second partial Received Signal Strength Indication measurement for the selected at least one mobile radio base station.

20 Claims, 13 Drawing Sheets

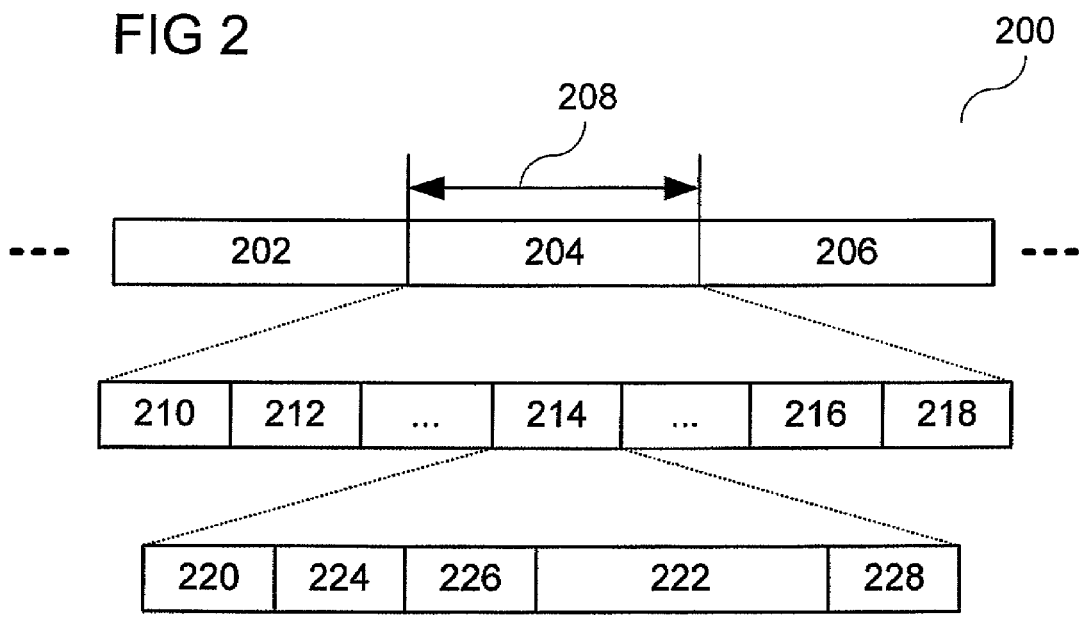
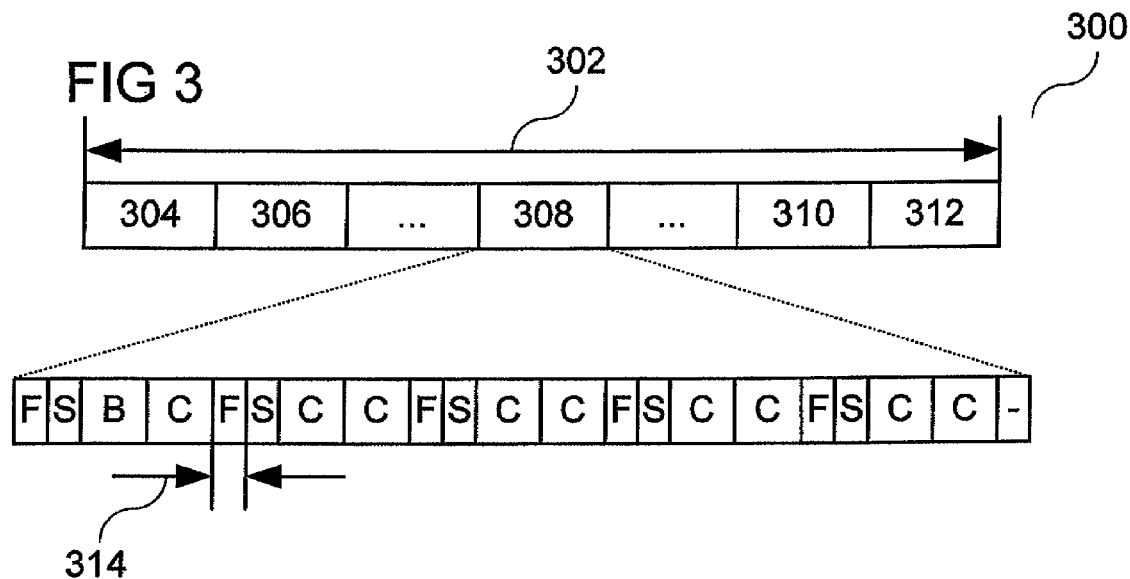

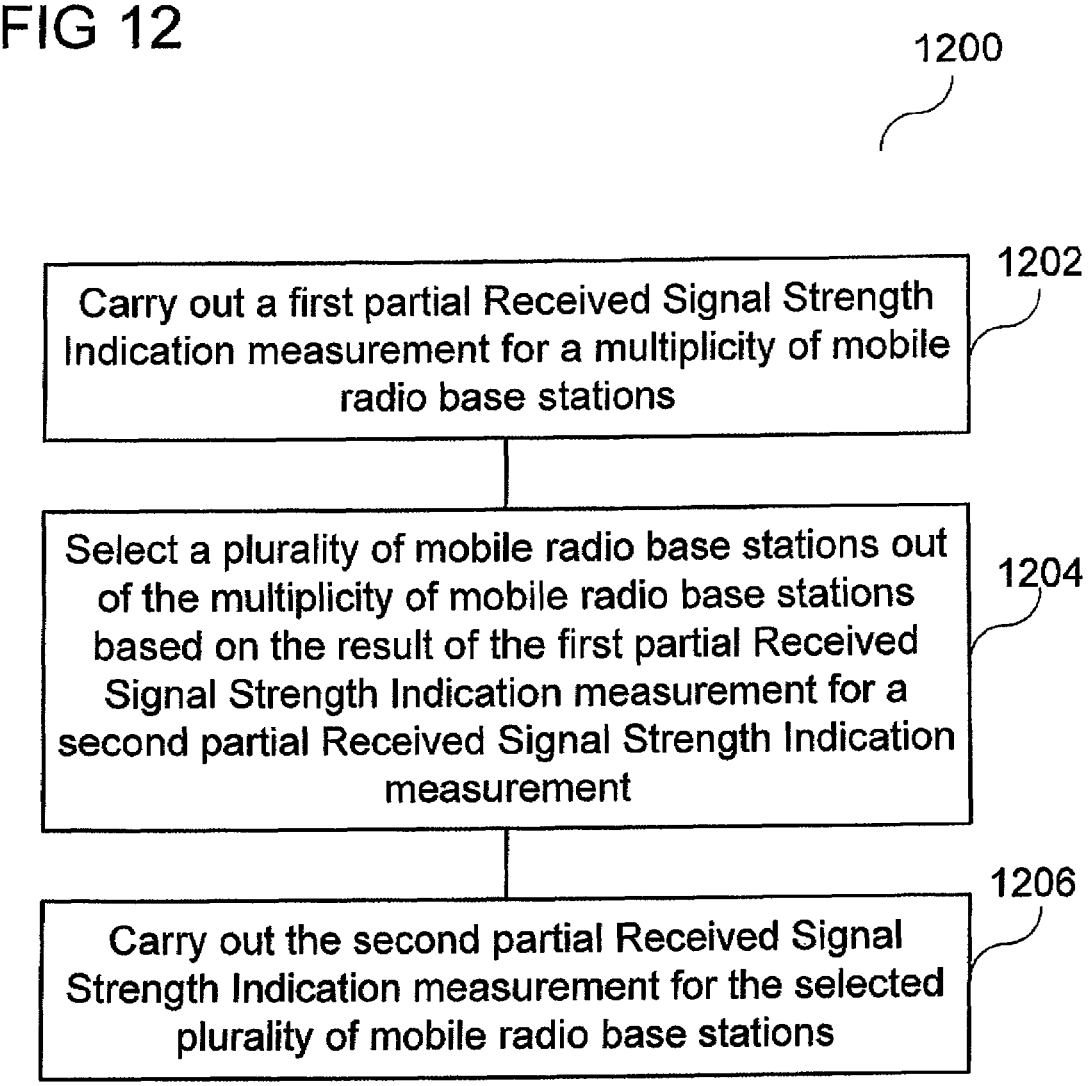

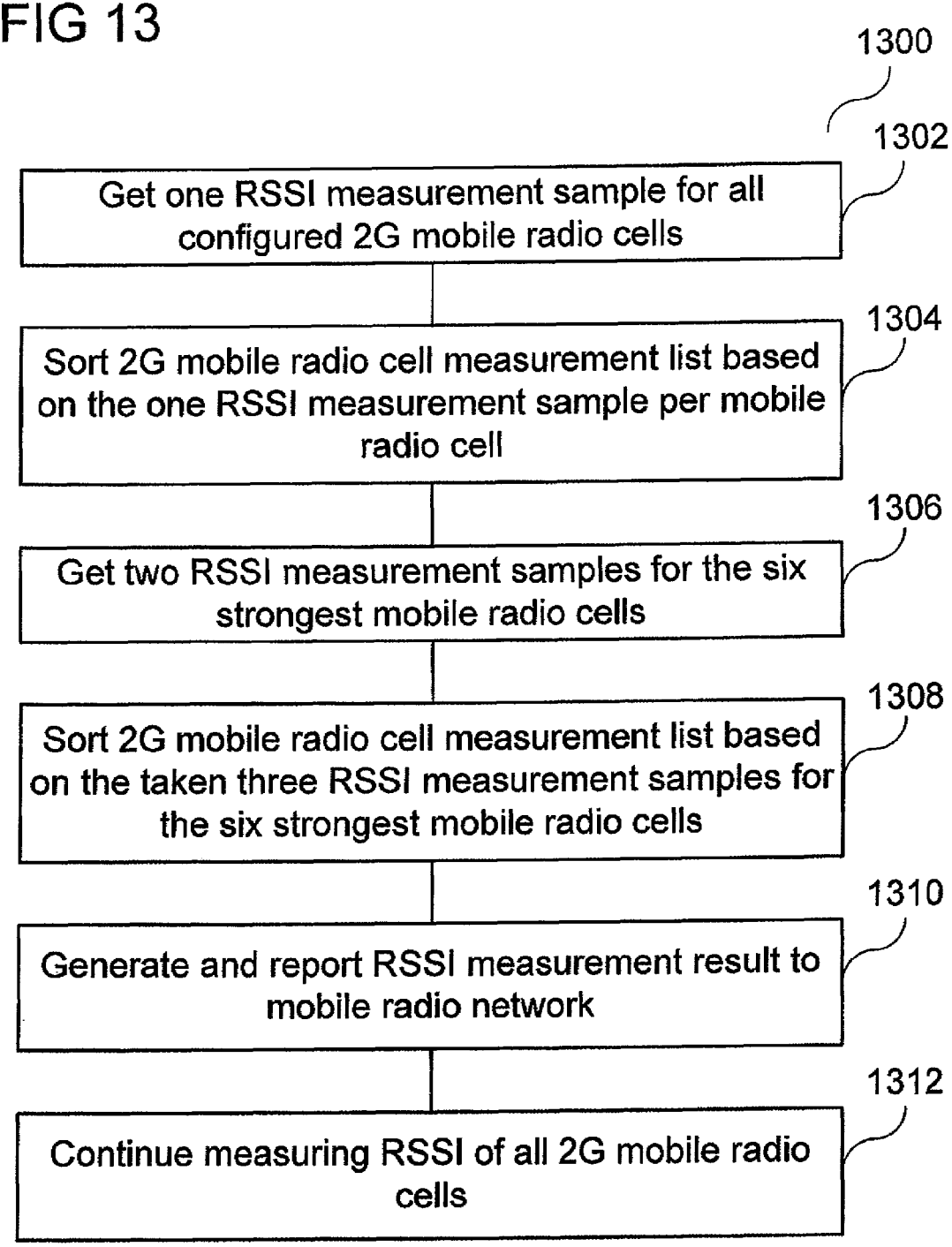

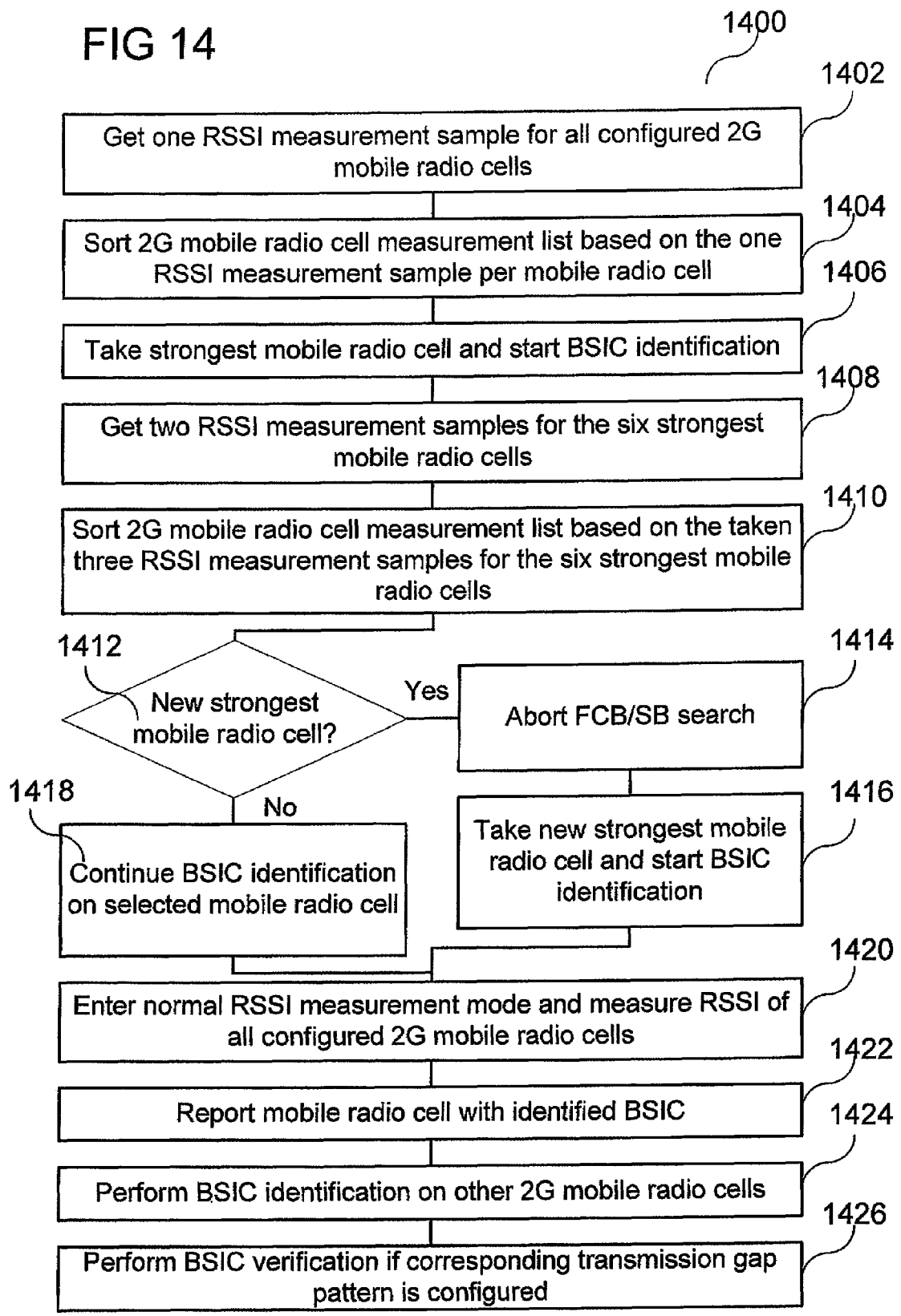

METHODS FOR MEASURING RECEIVED SIGNAL STRENGTH INDICATION, MEASUREMENT DEVICES, AND RADIO COMMUNICATION DEVICE

TECHNICAL FIELD

Embodiments relate generally to methods for measuring received signal strength indication, to measurement devices, and to a radio communication device.

BACKGROUND

In case a mobile radio communication terminal device such as a User Equipment (UE) leaves a Third Generation (3G) mobile radio coverage and enters a Second Generation (2G) mobile radio coverage, it needs to be ready to handover from 3G to 2G as fast as possible since the 3G coverage may disappear quickly. If a suitable 2G mobile radio cell a handover can be executed to cannot be found in time, the mobile radio call will drop.

A conventional implementation is done according to the 3GPP mobile radio communication standards for 2G mobile radio measurements in the so-called 3G dedicated mode.

In a first mode of the 3G dedicated mode, it is provided that the mobile radio network only activates so-called mobile radio compressed mode transmission gaps for "GSM carrier RSSI measurements". In such a scenario, a conventional implementation is as follows:

The UE measures the received signal strength indication (RSSI) of all configured 2G mobile radio cells three times, in other words, the UE gets three RSSI measurement samples for all configured 2G mobile radio cells. After the three RSSI measurements have been completed, the UE sorts the 2G mobile radio cells based on the averaged RSSI measurement result, in other words, based on the averaged three RSSI measurement samples. Then, the UE sends an RSSI measurement report to the mobile radio network. Furthermore, the UE continues measuring the RSSI of all configured 2G mobile radio cells.

In a second mode of the 3G dedicated mode, it is provided that the mobile radio network activates so-called mobile radio compressed mode transmission gaps for "GSM carrier RSSI measurements" and at least transmission gaps for "GSM initial BSIC identification". In such a scenario, a conventional implementation is as follows:

The UE measures the received signal strength indication (RSSI) of all configured 2G mobile radio cells three times using the "GSM carrier RSSI measurements" transmission gaps, in other words, the UE gets three RSSI measurement samples for all configured 2G mobile radio cells. After the three RSSI measurements have been completed, the UE sorts the 2G mobile radio cells based on the averaged RSSI measurement result, in other words, based on the averaged three RSSI measurement samples per mobile radio cell. Then, the UE selects the strongest mobile radio cell from the sorted list and starts base station identity code (BSIC) identification procedure using the "GSM initial BSIC identification" transmission gaps. If BSIC is identified, a report containing the identified 2G mobile radio cell is sent to the mobile radio network. Furthermore, the UE continues to measure the RSSI of all configured 2G mobile radio cells. The UE continues BSIC identification on other 2G mobile radio cells, and if compressed mode transmission gaps with the purpose "GSM BSIC re-confirmation" are activated, the UE performs BSIC verification procedure on mobile radio cells with a known BSIC, in other words, a BSIC verification is performed if the corresponding transmission gap pattern is configured.

A UE requiring compressed mode shall perform the RSSI measurement in compressed mode transmission gaps with the assigned purpose being "GSM carrier RSSI measurement". Depending on the number of 2G neighbor mobile radio cells assigned by the mobile radio network to the UE, collecting three measurement samples for all GSM neighbor mobile radio cells before being ready to start synchronisation to the strongest GSM neighbor mobile radio cell, can be a time consuming process. This contributes to the overall time the UE needs to be ready to handover to GSM and a suitable GSM neighbor mobile radio cell and increases the risk of a call drop.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 2 shows a frame structure for the downlink transmission in accordance with an embodiment in accordance with UMTS;

FIG. 3 shows a frame structure for the downlink transmission in accordance with an embodiment in accordance with GSM;

FIG. 12 shows a flow diagram illustrating a method for measuring Received Signal Strength Indication in accordance with another embodiment;

FIG. 13 shows a flow diagram illustrating a method for measuring Received Signal Strength Indication in accordance with yet another embodiment; and FIG. 14 shows a flow diagram illustrating a method for measuring Received Signal Strength Indication in accordance with yet another embodiment.

DESCRIPTION

Figure 1:
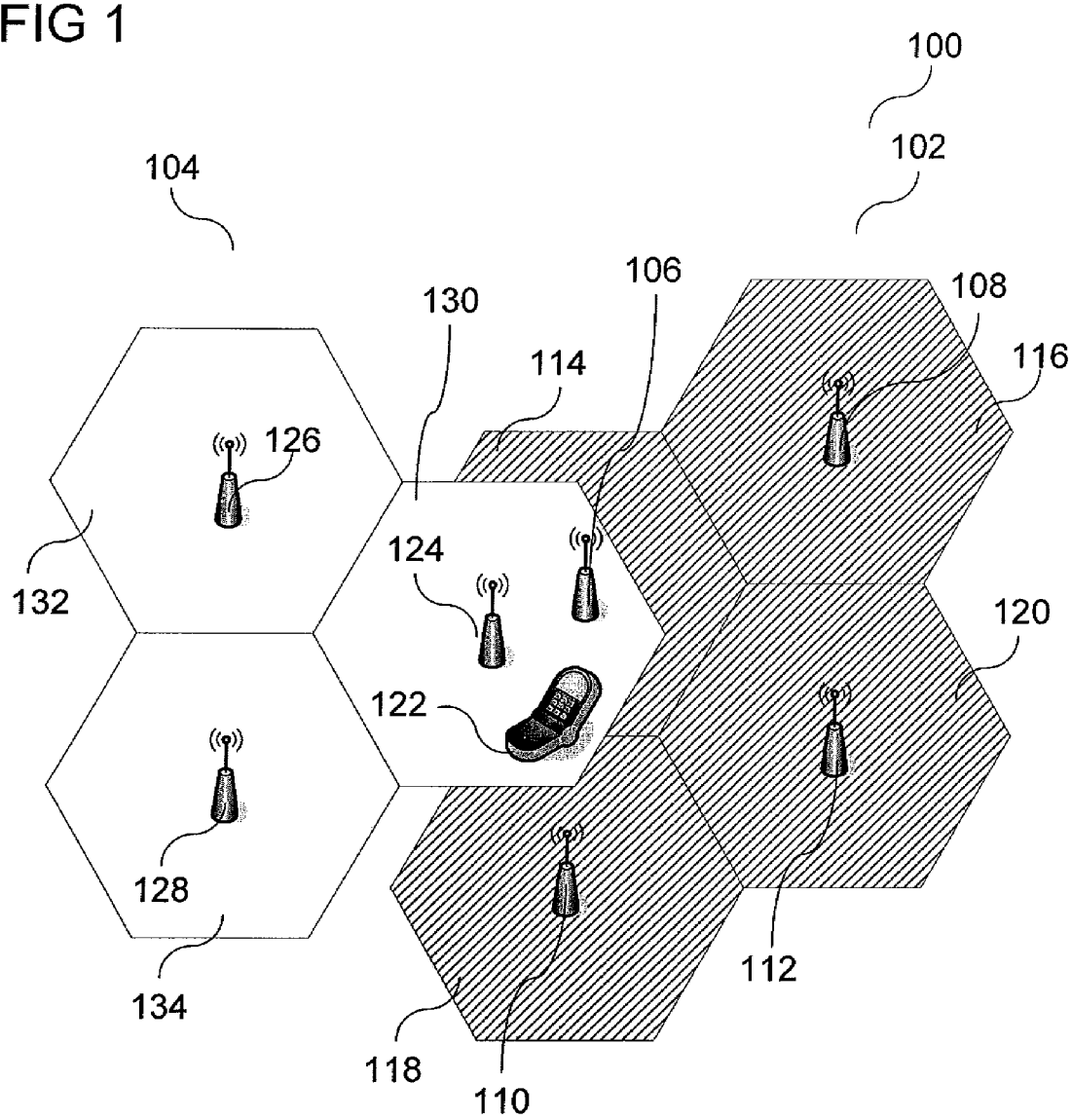
FIG. 1 shows a mobile radio communication system in accordance with an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The word "exemplary" is used herein to mean "serving as an example, instance, or illustration". Any embodiment or design described herein as "exemplary" is not necessarily to be construed as preferred or advantageous over other embodiments or designs.

In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In various embodiments, techniques for efficiently carrying out mobile radio cell measurements, e.g. in an asynchronous mobile radio network, are provided. By way of example, the mobile radio network may include a plurality of mobile radio networks such as e.g. a mobile radio network being configured in accordance with a Cellular Wide Area radio communication technology. In various embodiments, at least one of the mobile radio networks may be configured in accordance with a Third Generation Partnership Project (3GPP) mobile radio communication technology (e.g. UMTS or LTE), and at least one other of the mobile radio networks may be configured in accordance with a Second Generation Partnership Project (2G) mobile radio communication technology (e.g. GSM). Examples of various Cellular Wide Area radio communication technologies that may be provided in various embodiments may include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advance (Long Term Evolution Advance)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Thrid generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)).

In an embodiment, as shown in FIG. 1, the mobile radio network 100 may be a public land mobile network (PLMN) and may include a 2G mobile radio network 102 (e.g. a GSM mobile radio network 102) and a 3GPP mobile radio network 104 (e.g. a UMTS mobile radio network 104). The GSM mobile radio network 102 is a radio access technology that provides voice and data communication services. The UMTS mobile radio network 104 is a radio access technology that provides voice and data communication services at higher data rates compared with the GSM mobile radio network 102. In the UMTS mobile radio network 104, Wideband Code Division Multiple Access (W-CDMA) is implemented as the technology for the UMTS Terrestrial Radio Access Network (UTRAN). The mobile radio networks 102, 104, which may implement different radio access technologies may be operated by the same or by different mobile radio network operators.

As shown in FIG. 1, in various embodiments, the GSM mobile radio network 102 may include a plurality of GSM mobile radio base stations (which may also be referred to as base transceiver stations (BTS)) 106, 108, 110, 112 (in general, an arbitrary number of GSM mobile radio base stations, four of which are shown in FIG. 1 for reasons of clarity), wherein each GSM mobile radio base station 106, 108, 110, 112 clearly provides radio coverage for one or more associated GSM (in general, 2G) mobile radio cells 114, 116, 118, 120, and thereby providing communication connections with one or more (in general an arbitrary number) of mobile radio communication terminal devices 122 (one of which is shown in FIG. 1). A base station controller (BSC) (not shown in FIG. 1) may be provided in the GSM mobile radio network 102, wherein the base station controller may be configured to coordinate and control the GSM mobile radio base stations 106, 108, 110, 112. The base station controller may be coupled with a GSM mobile radio core network (not shown).

As also shown in FIG. 1, in various embodiments, the UMTS mobile radio network 104 may include a plurality of UMTS mobile radio base stations (which may also be referred to as NodeBs) 124, 126, 128 (in general, an arbitrary number of UMTS mobile radio base stations, three of which are shown in FIG. 1 for reasons of clarity), wherein each UMTS mobile radio base station 124, 126, 128 clearly provides radio coverage for one or more associated UMTS (in general, 30) mobile radio cells 130, 132, 134, and thereby providing communication connections with one or more (in general an arbitrary number of mobile radio communication terminal devices 122 (one of which is shown in FIG. 1). It is to be noted that in these embodiments, the mobile radio communication terminal devices 122 are multi-mode mobile radio communication terminal devices 122, in other words mobile radio communication terminal devices 122 which are capable of communicating in accordance with the 2G (e.g. GSM) as well as 3G (e.g. UMTS) mobile radio communication technology and possibly in accordance with other mobile radio communication technologies, if desired (usually, with one mobile radio network 102, 104 at any given time). A radio network controller (RNC) (not shown in FIG. 1) may be provided in the UMTS mobile radio network 104, wherein the radio network controller may be configured to coordinate and control the UMTS mobile radio base stations 124, 126, 128. The radio network controller may be coupled with a UMTS mobile radio core network (not shown). In various embodiments, the radio network controller may be configured to communicate with the base station controller to provide communication between the UMTS mobile radio network 104 and the GSM mobile radio network 102.

As shown in FIG. 1, the coverage area some of the GSM mobile radio base stations 106, 108, 110, 112 and the coverage area some of the UMTS mobile radio base station 124, 126, 128 may partially or fully overlap with each other. In the embodiment shown in FIG. 1, the coverage area of the GSM mobile radio base stations 106, 110 overlap with the coverage area of the UMTS mobile radio base station 124.

In various embodiments, the mobile radio communication terminal device 122 may be configured as a fixed mobile radio communication terminal device or as a portable mobile radio communication terminal device. The mobile radio communication terminal device 122 may e.g. be implemented as a mobile phone (which may be referred to as e.g. User Equipment (UE), Mobile Station (MS), Mobile Equipment (ME)), a notebook, a laptop, a Personal Computer, a Personal Digital Assistant (PDA), a mobile radio modem, and the like.

FIG. 2 shows a frame structure 200 for the downlink transmission (Uplink: signal transmission from the mobile radio communication terminal device 122 to the respective UMTS mobile radio base station 124, 126, 128; Downlink: signal transmission from the respective associated UMTS mobile radio base station 124, 126, 128 to the mobile radio communication terminal device 122) in accordance with an embodiment in accordance with UMTS.

In various embodiments, the frame structure 200 may be used for signal transmission using a downlink Dedicated Physical CHannel (DPCH), which may carry user-specific data for the mobile radio communication terminal devices 122. The timeline for data transmission may be divided into a plurality of radio frames 202, 204, 206. Each one of the radio frames 202, 204, 206 may be identified by a connection frame number (CFN) (e.g. having a length of 12 bit) that may be sent on a control channel. The system frame number may be reset to a predefined value (e.g. the value "zero") after having reached a predefined maximum value (e.g. the value 255). Each one of the radio frames 202, 204, 206 may have a duration of e.g. 10 ms (symbolized in FIG. 2 as a double arrow 208) and may be further partitioned into a plurality of e.g. 15 time slots 210, 212, 214, 216, 218, which may be labeled as time slot #0 through to time slot #14. Each time slot 210, 212, 214, 216, 218 may include a plurality of e.g. two data fields (e.g. a first data field 220 and a second data field 222) for carrying user-specific data, a transmit power control (TPC) field 224 for carrying power control information, a transport format combination indicator (TFCI) field 226 for carrying format information (e.g. the number of transport blocks, the sizes of transport blocks, and the like), and a pilot field 228 for carrying a pilot.

FIG. 3 shows a frame structure 300 for the downlink transmission in accordance with an embodiment in accordance with GSM. The timeline for data transmission may be divided into a plurality of superframes 302, one of which is shown in FIG. 3. Each superframe 302 may have a predefined duration (e.g. 6.12 seconds) and may include 1326 time division multiple access (TDMA) frames. A superframe 302 may be partitioned into e.g. 26 51-frame multiframes 304, 306, 308, 310, 312 or 51 26-frame multiframes (not shown). In various embodiments, the control/overhead channels provided in the GSM mobile radio network 102 may use the 26 51-frame multiframes 304, 306, 308, 310, 312 structure. Each of the 26 51-frame multiframes 304, 306, 308, 310, 312 may include a plurality of e.g. 51 TDMA frames 314 (which may also be referred to as GSM frames 314), which may be labeled as TDMA frames 0 through 50. Each TDMA frame 314 may have a duration of a predetermined time (e.g. 4.615 ms).

In various embodiments, control channels for the GSM mobile radio network 102 may include a frequency correction channel (FCCH), a synchronization channel (SCH), a broadcast channel (BCCH), and a common control channel (CCCH). The FCCH may carry a tone that allows the mobile radio communication terminal devices (e.g. 122) to obtain frequency and coarse timing information for the respective GSM mobile radio cell 114, 116, 118, 120 transmitting the FCCH. The FCCH may be sent in GSM frames 314 number 0, 10, 0, 30, and 40 of each 51-frame multiframe 304, 306, 308, 310, 312. Furthermore, in various embodiments, the SCH may carry a reduced GSM frame number (RFN) that is used by the mobile radio communication terminal devices (e.g. 122) to synchronize their timing and frame numbering. Moreover, the SCH may carry a BSIC that identifies the GSM mobile radio cell 114, 116, 118, 120 transmitting the SCH. The SCH may be sent in GSM frames 314 number 1, 11, 21, 31, and 41 of each 51-frame multiframe 304, 306, 308, 310, 312. In various embodiments, the BCCH may carry system information and may be sent in GSM frames 314 number 2, 3, 4, and 5 of each 51-frame multiframe 304, 306, 308, 310, 312. In various embodiments, the CCCH may carry control information and may be provided to implement a paging channel (PCH), which may carry paging messages for idle mobile radio communication terminal devices.

In various embodiments, the GSM mobile radio network 102 may be configured to operate on one or more frequency bands. Each frequency band may cover a range of frequencies and may be divided into a plurality of e.g. 200 kHz radio frequency channels, wherein each radio frequency channel may be identified by means of a specific absolute radio frequency channel number (ARFCN). By way of example, the GSM 900 frequency band includes absolute radio frequency channel number 1 through absolute radio frequency channel number 124, the GSM 1800 frequency band includes absolute radio frequency channel number 512 through absolute radio frequency channel number 885, and the GSM 1900 frequency band includes absolute radio frequency channel number 512 through absolute radio frequency channel number 810.

In various embodiments, each GSM (in general, 2G) mobile radio cell 114, 116, 118, 120 may transmit traffic data and overhead data on a set of radio frequency channels assigned to that GSM mobile radio cell 114, 116, 118, 120 e.g. by a mobile radio network operator. In order to reduce inter-cell interference, GSM mobile radio cells 114, 116, 118, 120 located near each other may be assigned different sets of radio frequency channels, so that the transmission from these GSM mobile radio cells 114, 116, 118, 120 do not interfere one another. In various embodiments, each GSM (in general, 2G) mobile radio cell 114, 116, 118, 120 may transmit the FCCH, SCH, and BCCH on one or more of the radio frequency channels assigned to the respective GSM mobile radio cell 114, 116, 118, 120. A radio frequency channel provided for the transmission of these control channels may also be referred to as BCCH carrier.

In various embodiments, it may be provided that each mobile radio communication terminal device (e.g. 122) may have an established communication connection with the UMTS mobile radio network 104, e.g. for voice data transmission and/or packet data transmission. In addition, it may be provided that the mobile radio communication terminal device (e.g. 122) may receive (e.g. via the air interface, e.g. via the UTRAN) a mobile radio neighbor cell list, which may include information about one or more mobile radio neighbor cells to be monitored by the mobile radio communication terminal device (e.g. 122) (e.g. to be measured with respect to the received signal quality). In various embodiments, the mobile radio neighbor cell list may include a plurality of (e.g. up to 32) GSM mobile radio neighbor cells and/or a plurality of (e.g. up to 64) UMTS mobile radio neighbor cells. The mobile radio neighbor cell list may indicate the ARFCN of the BCCH carrier and the BSIC of each GSM mobile radio neighbor cell and the universal ARFCN (UARFCN) and the scrambling code of each UMTS mobile radio neighbor cell. In various embodiments, the mobile radio communication terminal device (e.g. 122) (e.g. after having received the mobile radio neighbor cell list from the mobile radio core network) may (e.g. continuously) carry out radio signal measurements for the GSM mobile radio neighbor cell and the UMTS mobile radio neighbor cells contained in the mobile radio neighbor cell list, to search for better mobile radio cells.

In order to carry out radio signal measurements for the GSM mobile radio neighbor cells, the mobile radio communication terminal device (e.g. 122) may be required to tune its radio frequency receiver away from the current UMTS serving mobile radio cell. While tuned away, the mobile radio communication terminal device (e.g. 122) may not be able to receive data from or transmit data to the current UMTS serving mobile radio cell. In various embodiments, the UMTS mobile radio network 104 may provide a mechanism to allow the mobile radio communication terminal device (e.g. 122) to carry out radio signal measurements for the GSM mobile radio neighbor cells without losing data from the UMTS mobile radio network 104.

In various embodiments, the UMTS mobile radio network 104 provides for a compressed mode on the downlink and/or uplink. In the compressed mode, the current UMTS serving mobile radio cell may transmit data to the mobile radio communication terminal device (e.g. 122) during only a portion of a radio frame, which then may create a transmission gap in the remaining portion of the radio frame. In case of an uplink compressed mode, the mobile radio communication terminal device (e.g. 122) may transmit data to the current UMTS serving mobile radio cells during only a portion of a radio frame, which then may create a transmission gap in the remaining portion of the radio frame.

Figure 4:
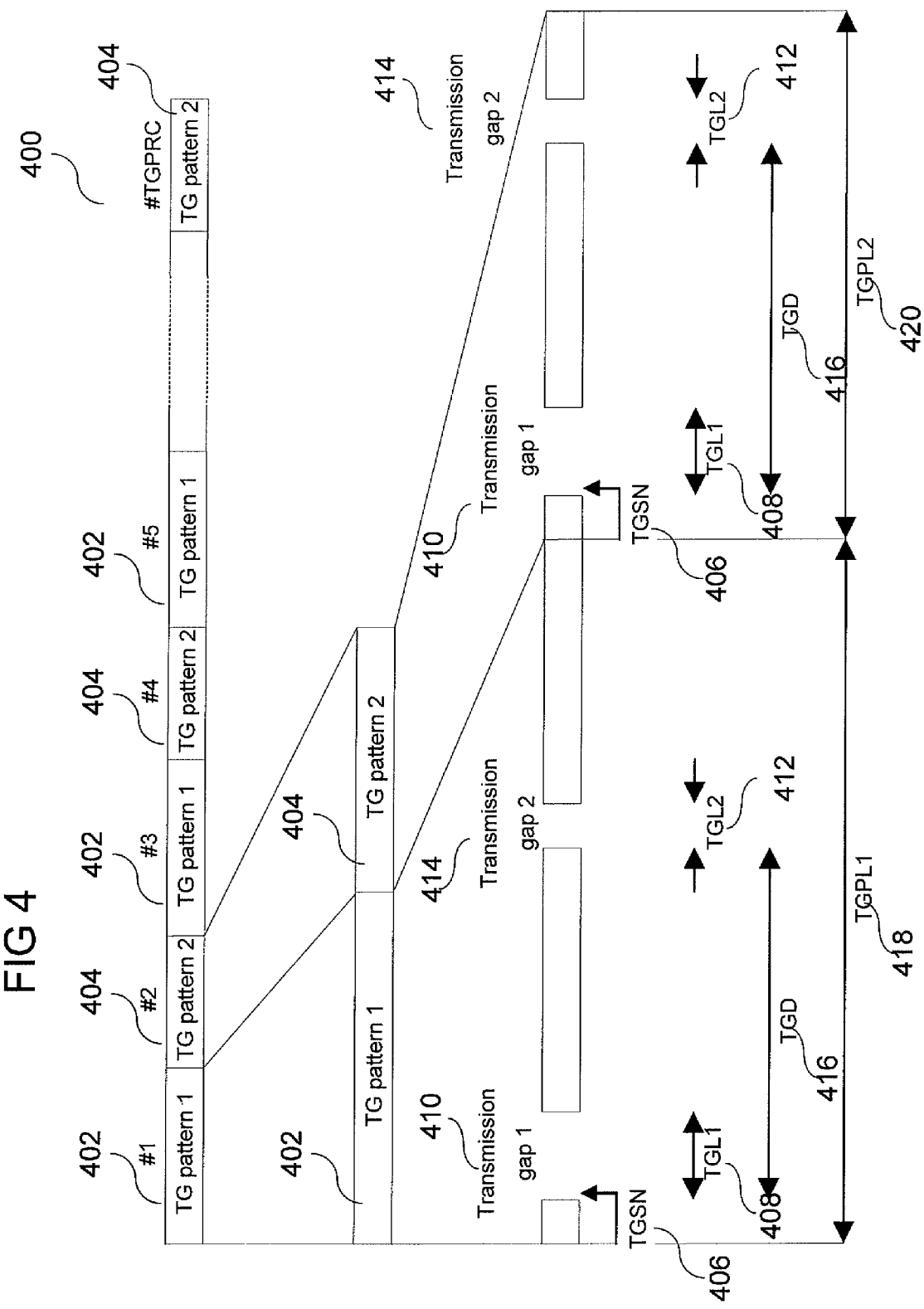
FIG. 4 shows a transmission scheme of a compressed mode transmission in accordance with an embodiment in accordance with UMTS.

FIG. 4 shows a transmission scheme 400 of a compressed mode transmission in accordance with an embodiment in accordance with UMTS.

In various embodiments, in response to a request from higher communication protocol layers, the UTRAN (e.g. the UMTS mobile radio base stations 124, 126, 128) may signal to the mobile radio communication terminal device (e.g. 122) the compressed mode parameters. A transmission gap pattern sequence may include or consist of alternating transmission gap patterns 1 (e.g. designated by reference number 402) and 2 (e.g. designated by reference number 404), each of these patterns in turn consists of one or two transmission gaps.

In various embodiments, the following parameters may be provided to characterise a transmission gap pattern 402, 404:

TGSN (Transmission Gap Starting Slot Number) 406: A transmission gap pattern 402, 406 begins in a radio frame, henceforward called first radio frame of the transmission gap pattern 402, 406, containing at least one transmission gap slot. TGSN 406 is the time slot number of the first transmission gap slot within the first radio frame of the transmission gap pattern 402, 404;

TGL1 (Transmission Gap Length 1) 408: This is the duration of the first transmission gap 410 within the transmission gap pattern 402, 404, expressed in number of time slots;

TGL2 (Transmission Gap Length 2) 412: This is the duration of the second transmission gap 414 within the transmission gap pattern 402, 404, expressed in number of time slots. If this parameter is not explicitly set by higher layers, then TGL2=TGL1;

TGD (Transmission Gap start Distance) 416: This is the duration between the starting time slots of two consecutive transmission gaps 410, 414 within a transmission gap pattern 402, 404, expressed in number of time slots. If this parameter is not set by higher communication protocol layers, then there is only one transmission gap 410 in the transmission gap pattern 402, 404;

TGPL1 (Transmission Gap Pattern Length) 418: This is the duration of transmission gap pattern 1402, expressed in number of frames;

TGPL2 (Transmission Gap Pattern Length) 420: This is the duration of transmission gap pattern 2 404, expressed in number of frames. If this parameter is not explicitly set by higher communication protocol layers, then TGPL2=TGPL1.

The following parameters may be provided in various embodiments to control the transmission gap pattern sequence start and repetition:

TGPRC (Transmission Gap Pattern Repetition Count): This is the number of transmission gap patterns within the transmission gap pattern sequence;

TGCFN (Transmission Gap Connection Frame Number): This is the CFN of the first radio frame of the first pattern 1 within the transmission gap pattern sequence.

In addition to the parameters defining the positions of transmission gaps 410, 414, each transmission gap pattern sequence may be described by:

UL/DL (UL: Uplink; DL: Downlink) compressed mode selection: This parameter specifies whether compressed mode is used in UL only, DL only or both UL and DL;

UL compressed mode method: The methods for generating the uplink compressed mode gap may be spreading factor division by two or higher communication protocol layer scheduling;

DL compressed mode method: The methods for generating the downlink compressed mode gap may be puncturing, spreading factor division by two or higher communication protocol layer scheduling;

downlink frame type: This parameter defines if frame structure type 'A' or 'B' shall be used in downlink compressed mode.

scrambling code change: This parameter indicates whether the alternative scrambling code is used for compressed mode method 'SF/2'. Alternative scrambling codes may be provided in alternative embodiments;

RPP: Recovery Period Power control mode specifies the uplink power control algorithm applied during recovery period after each transmission gap 410, 414 in compressed mode. RPP can take e.g. two values (0 or 1);

ITP: Initial Transmit Power mode selects the uplink power control method to calculate the initial transmit power after the gap. ITP can take e.g. two values (0 or 1).

In various embodiments, the mobile radio communication terminal device (e.g. 122) may be configured to support simultaneous compressed mode pattern sequences which can be used for different measurements. The following measurement purposes can be signalled from higher communication protocol layers:

Frequency Division Duplex (FDD);
Time Division Duplex (TDD);
GSM carrier RSSI measurement;
Initial BSIC identification;
BSIC reconfirmation.

In various embodiments, the mobile radio communication terminal device (e.g. 122) may be configured to support one compressed mode pattern sequence for each measurement purpose while operating in FDD mode, assuming the mobile radio communication terminal device (e.g. 122) needs compressed mode to perform the respective measurement. In case the mobile radio communication terminal device (e.g. 122) supports several of the measurement purposes, it may be configured to support in parallel one compressed mode pattern sequence for each supported measurement purpose where the mobile radio communication terminal device (e.g. 122) needs compressed mode to perform the measurement. The capability of the mobile radio communication terminal device (e.g. 122) to operate in compressed mode in uplink and downlink is given from the mobile radio communication terminal device (e.g. 122) capabilities.

Higher communication protocol layers may ensure that the compressed mode transmission gaps do not overlap and are not scheduled to overlap the same frame.

In all cases, higher communication protocol layers have control of individual mobile radio communication terminal device (e.g. 122) parameters. Any pattern sequence can be stopped on higher communication protocol layers' command.

In various embodiments, the parameters TGSN, TGL1, TGL2, TGD, TGPL1, TGPL2, TGPRC and TGCFN may all be integers.

Figure 5:
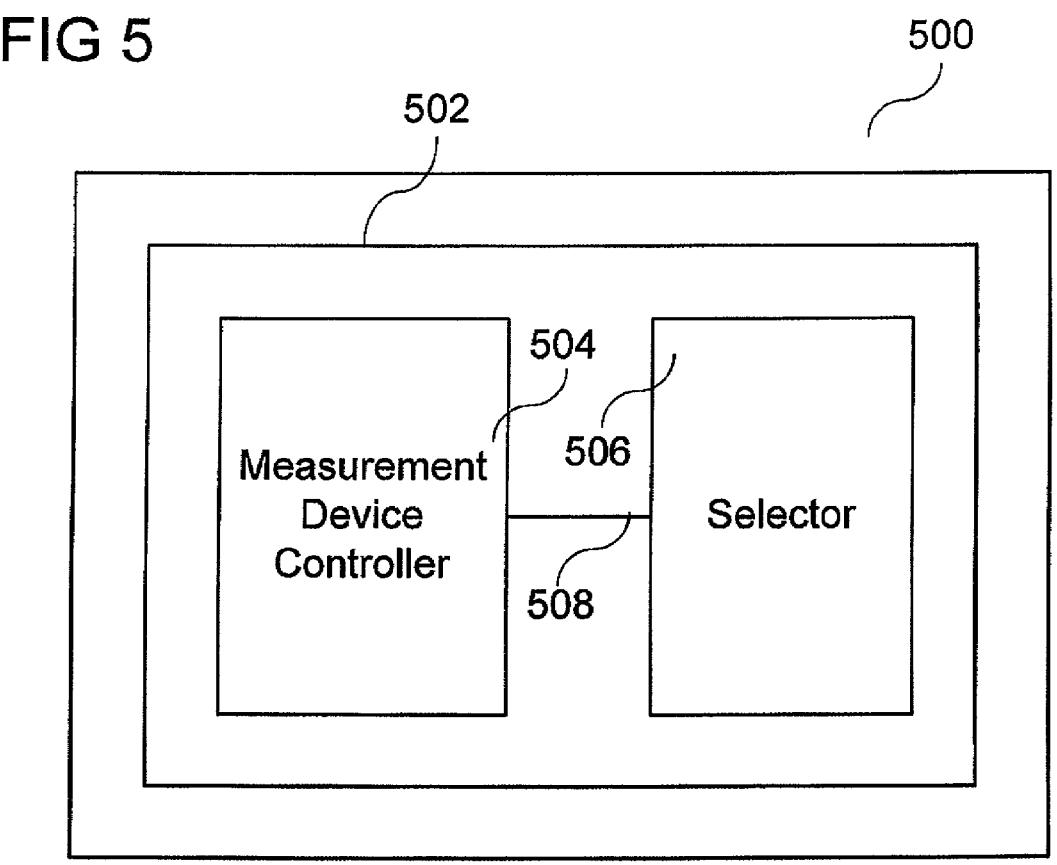
FIG. 5 shows a mobile radio communication device in accordance with an embodiment.

FIG. 5 shows a mobile radio communication device 500 (e.g. a mobile radio communication terminal device 500 as an example of the mobile radio communication terminal device 122) in accordance with an embodiment.

In various embodiments, the mobile radio communication device 500 may include a measurement device 502 for measuring Received Signal Strength Indication. The measurement device 502 may include a measurement device controller 504 configured to carry out a first partial Received Signal Strength Indication measurement for a plurality of mobile radio base stations, and a selector 506 configured to select at least one mobile radio base station out of the plurality of mobile radio base stations based on the result of the first partial Received Signal Strength Indication measurement for a second partial Received Signal Strength Indication measurement. In various embodiments, the measurement device controller 504 may further be configured to carry out the second partial Received Signal Strength Indication measurement for the selected at least one mobile radio base station. In various embodiments, the measurement device controller 504 and the selector 506 may be coupled with each other via an electrical connection (e.g. a cable or one or more electrically conductive lines, e.g. a computer bus connection) 508.

Figure 6:
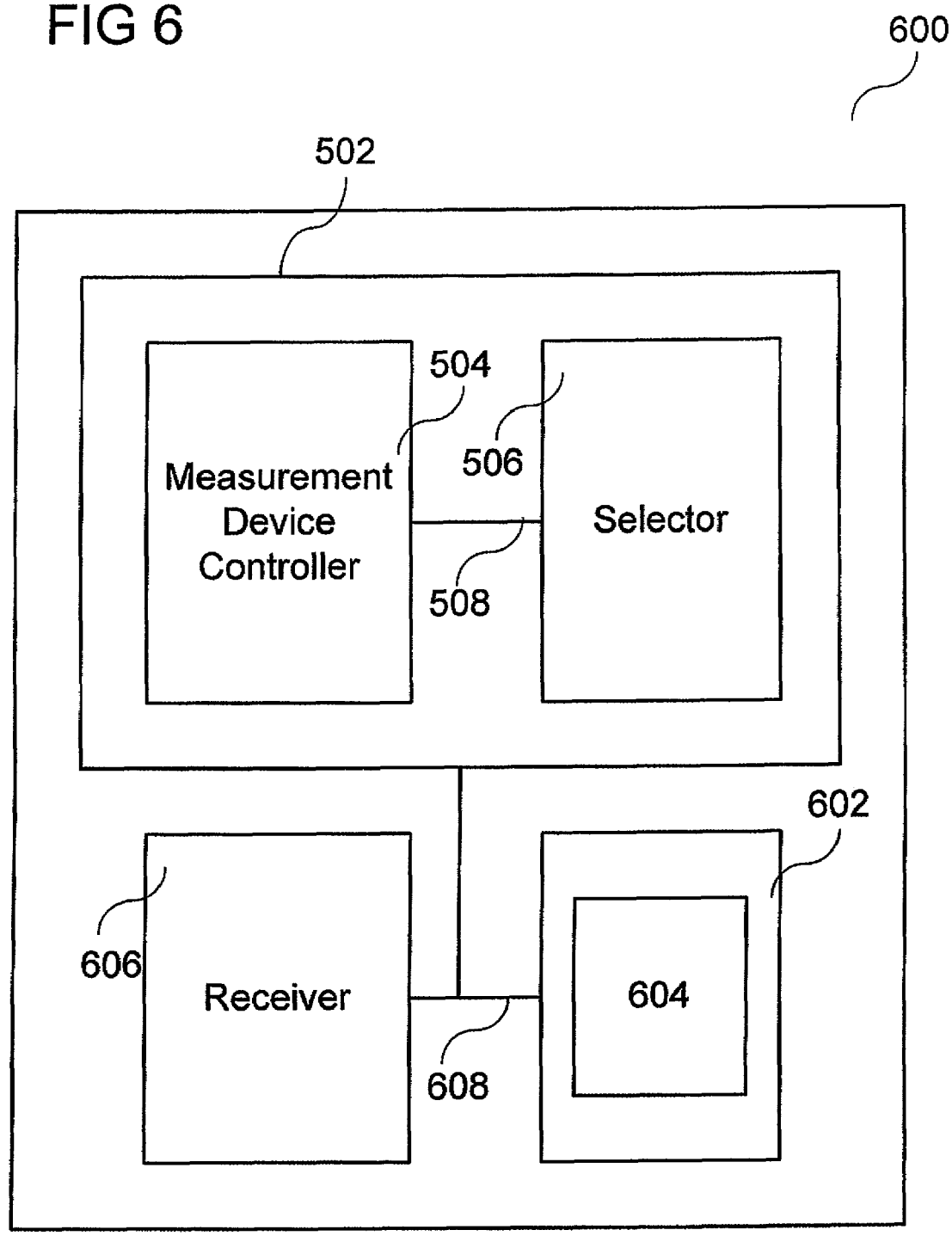
FIG. 6 shows a mobile radio communication device in accordance with another embodiment.

FIG. 6 shows a mobile radio communication device 600 (e.g. a mobile radio communication terminal device 600 (as an example of the mobile radio communication terminal device 122) in accordance with another embodiment.

The mobile radio communication device 600 shown in FIG. 6 is similar to the mobile radio communication device 500 shown in FIG. 5 and may further include a memory 602 to store a mobile radio neighbor cell list 604, such as a mobile radio neighbor cell list as described above. The measurement device controller 504 may further be configured to determine the plurality of mobile radio base stations from the mobile radio neighbor cell list. Optionally, the mobile radio communication device 600 may further include a receiver 606 configured to receive the mobile radio neighbor cell list 604 via a mobile radio communication connection (e.g. from a mobile radio network device such as e.g. from a mobile radio base station). The measurement device 502, the memory 602 and the receiver 606 may be coupled with each other via an electrical connection (e.g. a cable or one or more electrically conductive lines, e.g. a computer bus connection) 608.

In various embodiments, the selector 506 may further be configured to select the at least one mobile radio base station out of the plurality of mobile radio base stations which fulfills a predefined Received Signal Strength Indication receiving quality criterion for the Received Signal Strength Indication measured in the first partial Received Signal Strength Indication measurement.

Figure 7:
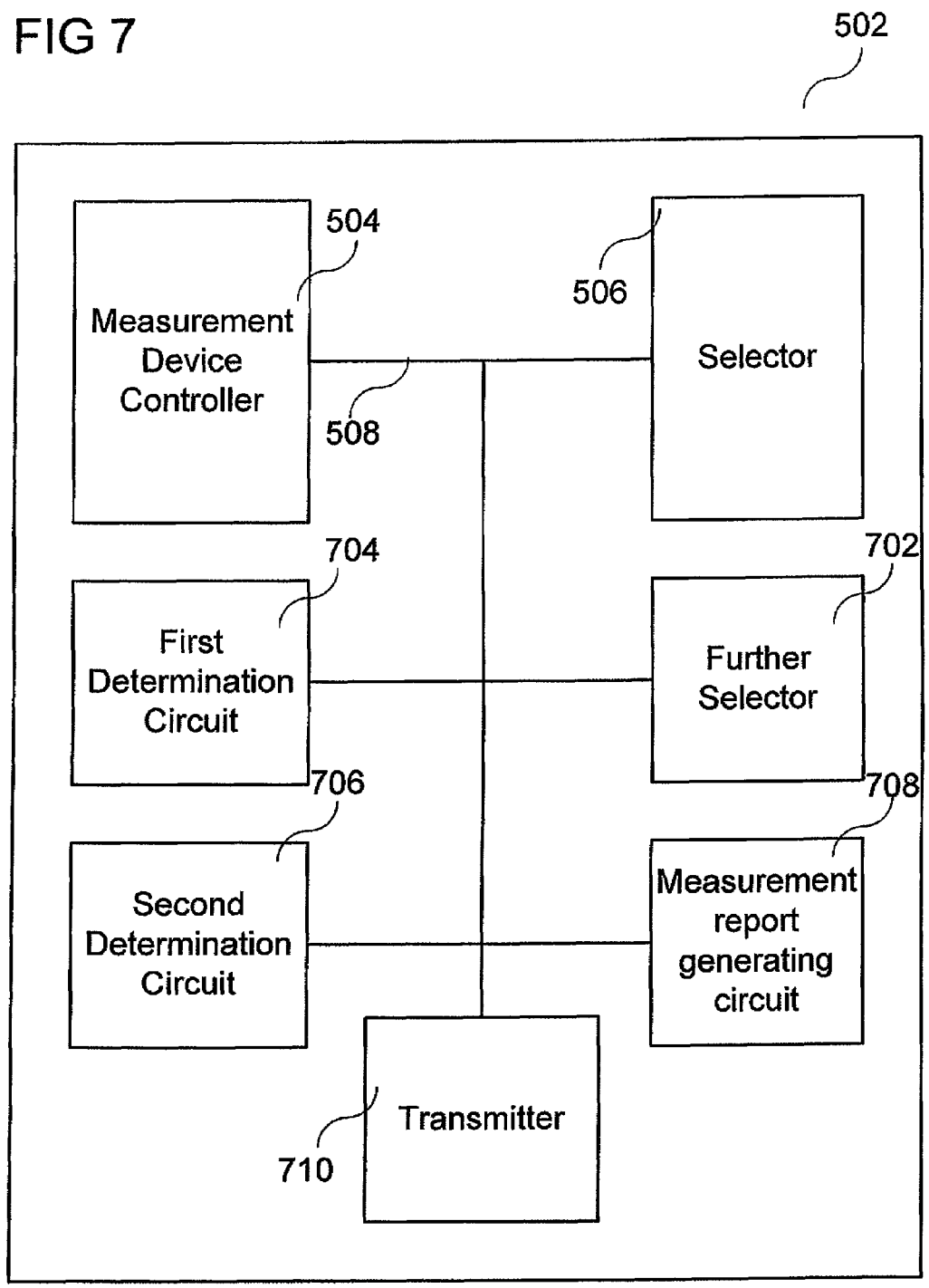
FIG. 7 shows a measurement device in accordance with another embodiment.

FIG. 7 shows a measurement device 700 in accordance with another embodiment.

The measurement device 700 shown in FIG. 7 is similar to the measurement device 502 shown in FIG. 5 and may further include a further selector 702 configured to select at least one mobile radio base station out of the plurality of mobile radio base stations based on the result of the second partial Received Signal Strength Indication measurement for a base station identity code identification process. Furthermore, optionally, a first determination circuit 704 may be provided which may be configured to determine as to whether the selected at least one mobile radio base station out of the plurality of mobile radio base stations based on the result of the first partial Received Signal Strength Indication measurement is different from the selected at least one mobile radio base station out of the plurality of mobile radio base stations based on the result of the second partial Received Signal Strength Indication measurement. In this embodiment, the measurement device controller 504 may further be configured, in case the selected at least one mobile radio base stations are different, to stop a base station identity code identification process for the selected at least one mobile radio base station, and to start a new base station identity code identification process for the selected at least one mobile radio base station based on the result of the second partial Received Signal Strength Indication measurement. Further optionally, the measurement device 700 may further include a second determination circuit 706 configured to determine a Received Signal Strength Indication measurement result based on the first partial Received Signal Strength Indication measurement and the second partial Received Signal Strength Indication measurement and/or a measurement report generating circuit 708 configured to generate a Received Signal Strength Indication measurement report based on the Received Signal Strength Indication measurement result. Moreover, as another option, the measurement device 700 (or alternatively, the mobile radio communication device 600) may further include a transmitter 710 configured to transmit the Received Signal Strength Indication measurement report to a mobile radio network device. In various embodiments, the measurement device controller 504, the selector 506, the further selector 702, the first determination circuit 704, the second determination circuit 706, the measurement report generating circuit 708, and the transmitter 710 may be coupled with each other via the electrical connection (e.g. a cable or one or more electrically conductive lines, e.g. a computer bus connection) 508.

In various embodiments, the measurement device controller 504 may further be configured to carry out at least one of the first partial Received Signal Strength Indication measurements and the second partial Received Signal Strength Indication measurements during a mobile radio transmission gap. In various embodiments, the measurement device controller 504 may further be configured such that the first partial Received Signal Strength Indication measurement includes measuring the Received Signal Strength Indication for the plurality of mobile radio base stations only a predetermined number of time which is smaller than a predetermined number of times provided for the Received Signal Strength Indication measurement. By way of example, the measurement device controller 504 may further be configured such that the first partial Received Signal Strength Indication measurement includes measuring the Received Signal Strength Indication for the plurality of mobile radio base stations only once, and/or such that the second partial Received Signal Strength Indication measurement includes measuring the Received Signal Strength Indication for the selected at least one mobile radio base stations only twice. Furthermore, the measurement device controller 504 may further be configured to carry out a base station identity code identification process for the selected at least one mobile radio base station. By way of example, the measurement device controller 504 may further be configured to carry out the base station identity code identification process while the second partial Received Signal Strength Indication measurement is carried out. In an implementation of various embodiments, the measurement device controller 504 may further be configured to carry out a GSM base station identity code identification process for the selected at least one mobile radio base station. In an implementation of various embodiments, the measurement device controller 504 may further be configured to carry out a base station identity code reconfirmation process for the selected at least one mobile radio base station for which the base station identity code identification process has been carried out. Moreover, the measurement device controller 504 may further be configured to carry out a GSM base station identity code re-confirmation process for the selected at least one mobile radio base station for which the base station identity code identification process has been carried out.

Figure 8:
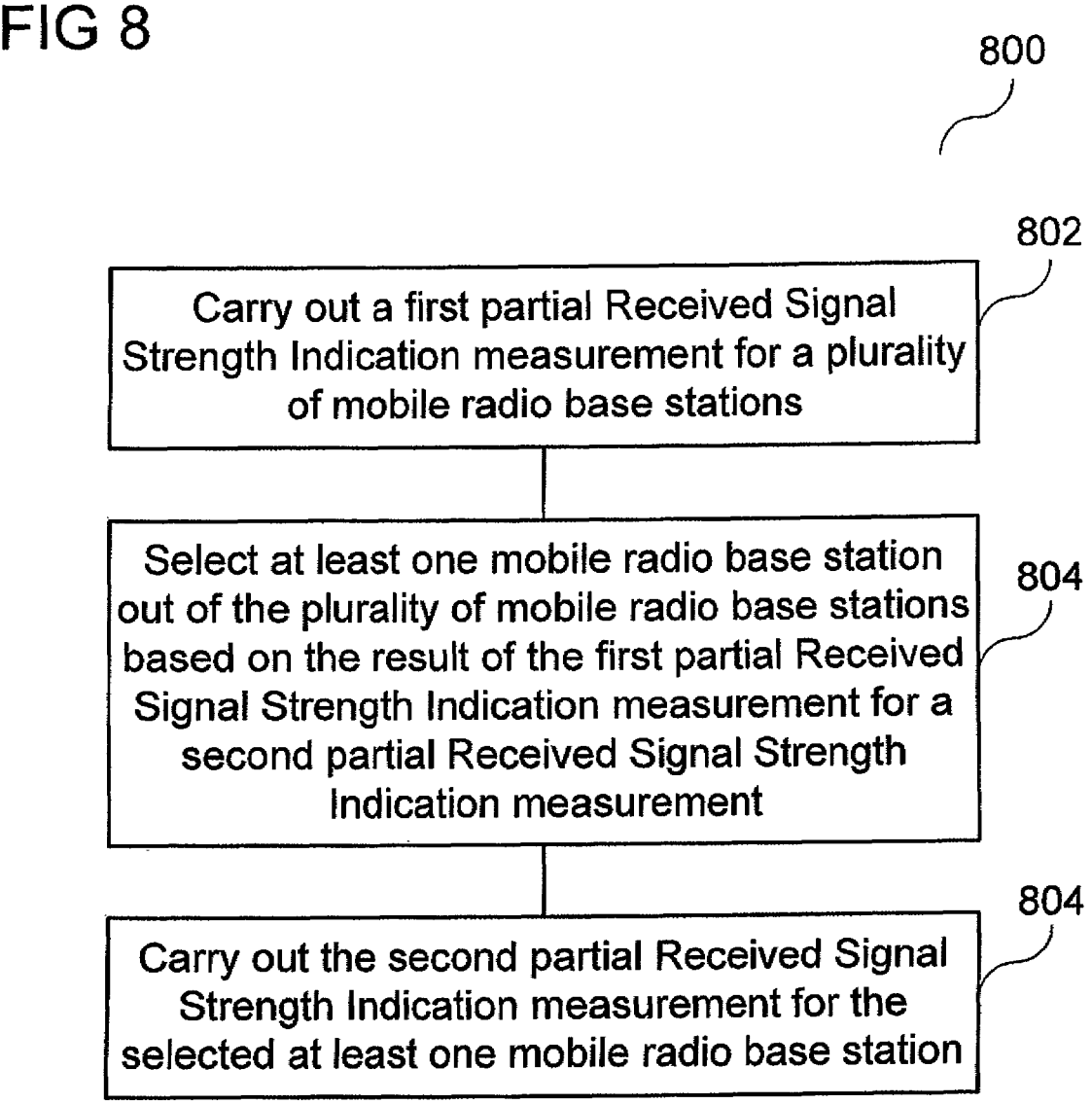
FIG. 8 shows a flow diagram illustrating a method for measuring Received Signal Strength Indication in accordance with an embodiment.

FIG. 8 shows a flow diagram 800 illustrating a method for measuring Received Signal Strength Indication in accordance with an embodiment.

The method may include, in 802, carrying out a first partial Received Signal Strength Indication measurement for a plurality of mobile radio base stations, and, in 804, selecting at least one mobile radio base station out of the plurality of mobile radio base stations based on the result of the first partial Received Signal Strength Indication measurement for a second partial Received Signal Strength Indication measurement. The method may further include, in 806, carrying out the second partial Received Signal Strength Indication measurement for the selected at least one mobile radio base station.

In an implementation of this embodiment, the method may further include determining the plurality of mobile radio base stations from a mobile radio neighbor cell list. In another implementation of this embodiment, the method may further include receiving the mobile radio neighbor cell list via a mobile radio communication connection, e.g. from a mobile radio network device. In yet another implementation of this embodiment, at least one of the first partial Received Signal Strength Indication measurements and the second partial Received Signal Strength Indication measurements may be carried out during a mobile radio transmission gap. In yet another implementation of this embodiment, the first partial Received Signal Strength Indication measurement may include measuring the Received Signal Strength Indication for the plurality of mobile radio base stations only a predetermined number of time which is smaller than a predetermined number of times provided for the Received Signal Strength Indication measurement. In yet another implementation of this embodiment, the first partial Received Signal Strength Indication measurement may include measuring the Received Signal Strength Indication for the plurality of mobile radio base stations only once. In yet another implementation of this embodiment, the second partial Received Signal Strength Indication measurement may include measuring the Received Signal Strength Indication for the at least one selected mobile radio base station only twice. In yet another implementation of this embodiment, the method may further include carrying out base station identity code identification process for the selected at least one mobile radio base station. In yet another implementation of this embodiment, the base station identity code identification process may be carried out while the second partial Received Signal Strength Indication measurement is carried out. In yet another implementation of this embodiment, the method may further include selecting at least one mobile radio base station out of the plurality of mobile radio base stations based on the result of the second partial Received Signal Strength Indication measurement for a base station identity code identification process. In yet another implementation of this embodiment, the method may further include determining as to whether the selected at least one mobile radio base station out of the plurality of mobile radio base stations based on the result of the first partial Received Signal Strength Indication measurement is different from the selected at least one mobile radio base station out of the plurality of mobile radio base stations based on the result of the second partial Received Signal Strength Indication measurement, and in case the selected at least one mobile radio base stations are different, stopping the base station identity code identification process for the selected at least one mobile radio base station, and starting a new base station identity code identification process for the selected at least one mobile radio base station based on the result of the second partial Received Signal Strength Indication measurement. In yet another implementation of this embodiment, the method may further include carrying out GSM base station identity code identification process for the selected at least one mobile radio base station. In yet another implementation of this embodiment, the method may further include carrying out a base station identity code re-confirmation process for the selected at least one mobile radio base station for which the base station identity code identification process has been carried out. In yet another implementation of this embodiment, the method may further include carrying out a GSM base station identity code reconfirmation process for the selected at least one mobile radio base station for which the base station identity code identification process has been carried out. In yet another implementation of this embodiment, the method may further include determining a Received Signal Strength Indication measurement result based on the first partial Received Signal Strength Indication measurement and the second partial Received Signal Strength Indication measurement. In yet another implementation of this embodiment, the method may further include generating a Received Signal Strength Indication measurement report based on the Received Signal Strength Indication measurement result. In yet another implementation of this embodiment, the method may further include transmitting the Received Signal Strength Indication measurement report to a mobile radio network device. In yet another implementation of this embodiment, the selecting at least one mobile radio base station out of the plurality of mobile radio base stations may include selecting the mobile radio base station out of the plurality of mobile radio base stations which fulfills a pre-defined Received Signal Strength Indication receiving quality criterion for the Received Signal Strength Indication measured in the first partial Received Signal Strength Indication measurement.

Figure 9:
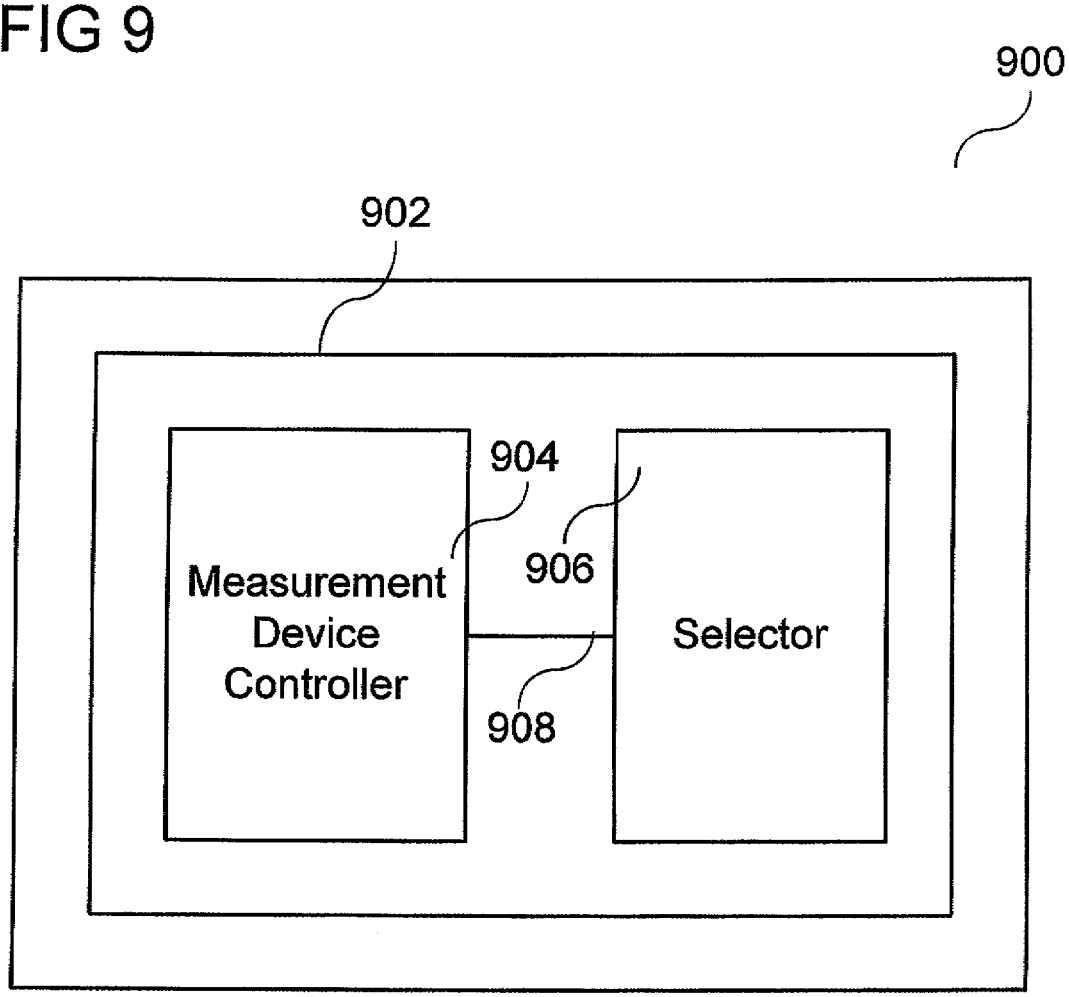
FIG. 9 shows a mobile radio communication device in accordance with yet another embodiment.

FIG. 9 shows a mobile radio communication device 900 (e.g. a mobile radio communication terminal device 900 as an example of the mobile radio communication terminal device 122) in accordance with yet another embodiment.

In various embodiments, the mobile radio communication device 900 may include a measurement device 902 for measuring Received Signal Strength Indication. The measurement device 902 may include a measurement device controller 904 configured to carry out a first partial Received Signal Strength Indication measurement for a multiplicity of mobile radio base stations, and a selector 906 configured to select a plurality of mobile radio base stations out of the multiplicity of mobile radio base stations based on the result of the first partial Received Signal Strength Indication measurement for a second partial Received Signal Strength Indication measurement. The measurement device controller 904 may further be configured to carry out the second partial Received Signal Strength Indication measurement for the selected plurality of mobile radio base stations. In various embodiments, the measurement device controller 904 and the selector 906 may be coupled with each other via an electrical connection (e.g. a cable or one or more electrically conductive lines, e.g. a computer bus connection) 908.

Figure 10:
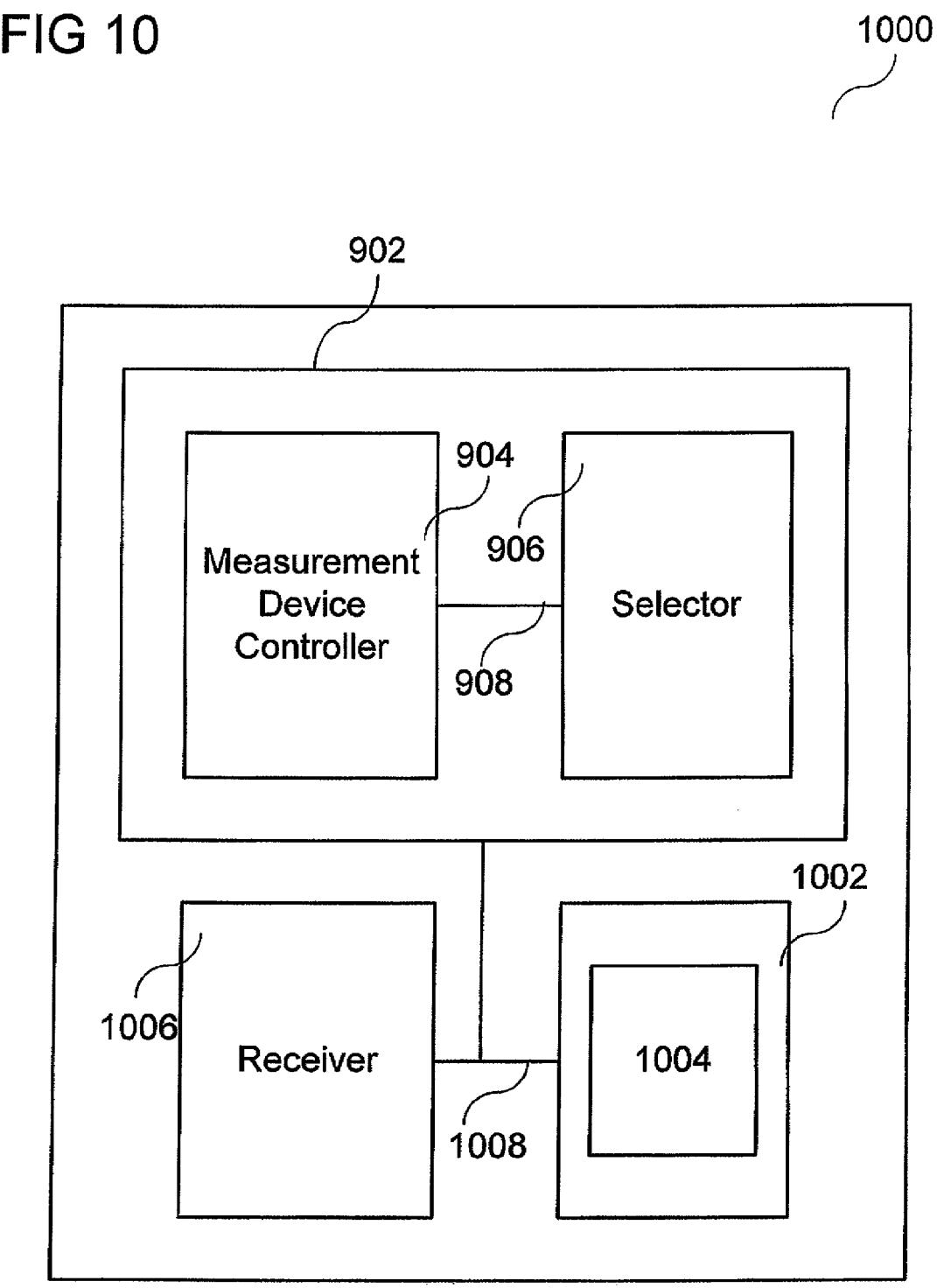
FIG. 10 shows a mobile radio communication device in accordance with yet another embodiment.

FIG. 10 shows a mobile radio communication device 1000 (e.g. a mobile radio communication terminal device 1000 (as an example of the mobile radio communication terminal device 122) in accordance with yet another embodiment.

The mobile radio communication device 1000 shown in FIG. 10 is similar to the mobile radio communication device 900 shown in FIG. 9 and may further include a memory 1002 to store a mobile radio neighbor cell list 1004, such as a mobile radio neighbor cell list as described above. The measurement device controller 904 may further be configured to determine the plurality of mobile radio base stations from the mobile radio neighbor cell list. Optionally, the mobile radio communication device 1000 may further include a receiver 1006 configured to receive the mobile radio neighbor cell list 1004 via a mobile radio communication connection (e.g. from a mobile radio network device such as e.g. from a mobile radio base station). The measurement device 902, the memory 1002 and the receiver 1006 may be coupled with each other via an electrical connection (e.g. a cable or one or more electrically conductive lines, e.g. a computer bus connection) 1008. In another option, the selector 906 may further be configured to the plurality of mobile radio base stations out of the multiplicity of mobile radio base stations comprises selecting the mobile radio base station out of the plurality of mobile radio base stations which fulfills a predefined Received Signal Strength Indication receiving quality criterion for the Received Signal Strength Indication measured in the first partial Received Signal Strength Indication measurement.

Figure 11:
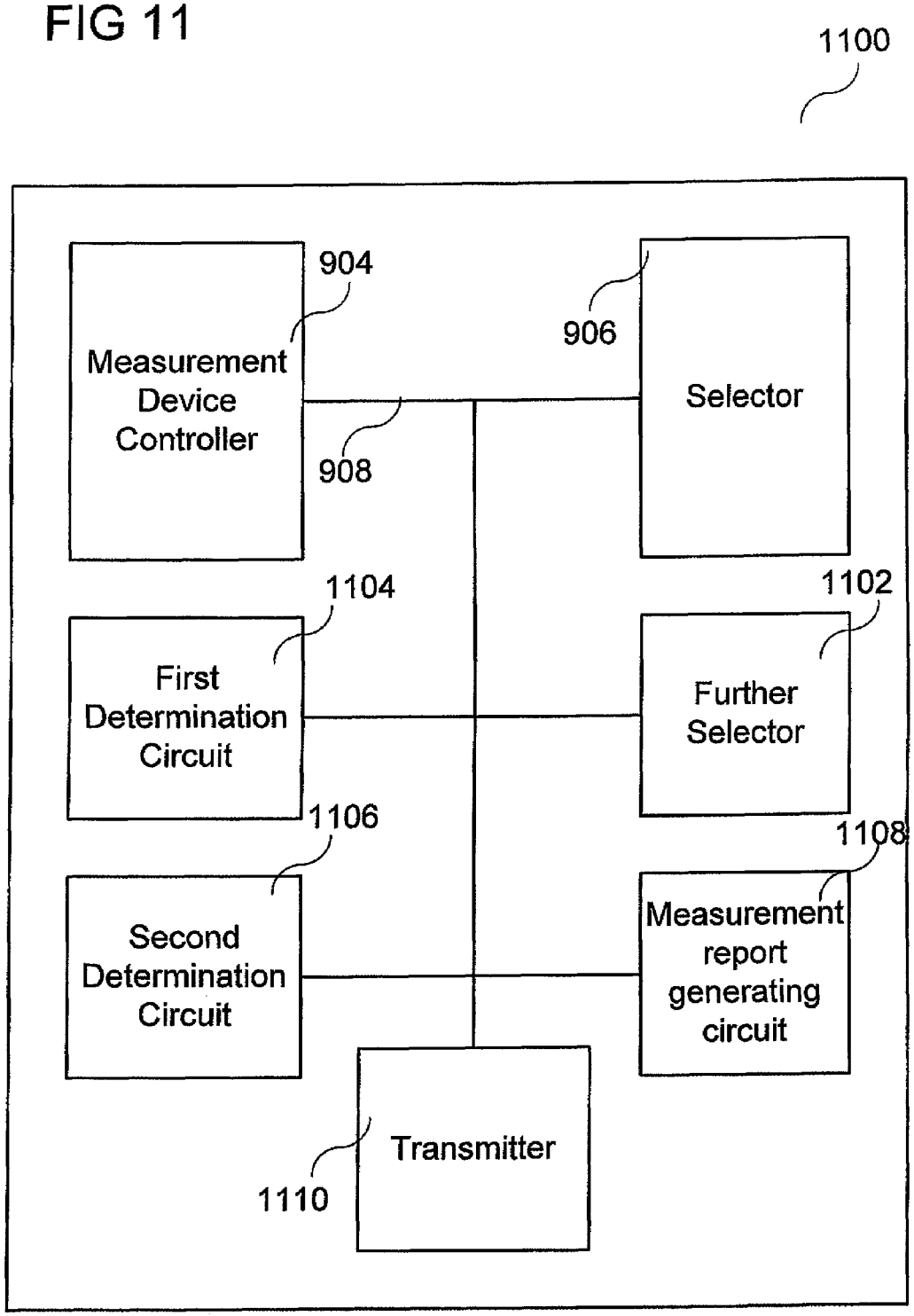
FIG. 11 shows a measurement device in accordance with yet another embodiment.

FIG. 11 shows a measurement device 1100 in accordance with another embodiment.

The measurement device 100 shown in FIG. 11 is similar to the measurement device 902 shown in FIG. 9 and may further include a further selector 1102 configured to select at least one mobile radio base station out of the plurality of mobile radio base stations based on the result of the second partial Received Signal Strength Indication measurement for a base station identity code identification process. Furthermore, optionally, a first determination circuit 1104 may be provided which may be configured to determine as to whether the selected plurality of mobile radio base stations out of the multiplicity of mobile radio base stations based on the result of the first partial Received Signal Strength Indication measurement is different from the selected at least one mobile radio base station out of the plurality of mobile radio base stations based on the result of the second partial Received Signal Strength Indication measurement. In this embodiment, the measurement device controller 904 may further be configured, in case the selected at least one mobile radio base stations are different, to stop a base station identity code identification process for the selected at least one mobile radio base station, and to start a new base station identity code identification process for the selected at least one mobile radio base station based on the result of the second partial Received Signal Strength Indication measurement. Further optionally, the measurement device 1100 may further include a second determination circuit 1106 configured to determine a Received Signal Strength Indication measurement result based on the first partial Received Signal Strength Indication measurement and the second partial Received Signal Strength Indication measurement and/or a measurement report generating circuit 1108 configured to generate a Received Signal Strength Indication measurement report based on the Received Signal Strength Indication measurement result. Moreover, as another option, the measurement device 1100 (or alternatively, the mobile radio communication device 900) may further include a transmitter 1110 configured to transmit the Received Signal Strength Indication measurement report to a mobile radio network device. In various embodiments, the measurement device controller 904, the selector 906, the further selector 1102, the first determination circuit 1104, the second determination circuit 1106, the measurement report generating circuit 1108, and the transmitter 1110 may be coupled with each other via the electrical connection (e.g. a cable or one or more electrically conductive lines, e.g. a computer bus connection) 908.

In various embodiments, the measurement device controller 904 may further be configured to carry out at least one of the first partial Received Signal Strength Indication measurements and the second partial Received Signal Strength Indication measurements during a mobile radio transmission gap. In various embodiments, the measurement device controller 904 may further be configured such that the first partial Received Signal Strength Indication measurement comprises measuring the Received Signal Strength Indication for the multiplicity of mobile radio base stations only a predetermined number of time which is smaller than a predetermined number of times provided for the Received Signal Strength Indication measurement. By way of example, the measurement device controller 904 may further be configured such that the first partial Received Signal Strength Indication measurement includes measuring the Received Signal Strength Indication for the multiplicity of mobile radio base stations only once, and/or such that the second partial Received Signal Strength Indication measurement comprises measuring the Received Signal Strength Indication for the plurality of mobile radio base stations only twice. Furthermore, the measurement device controller 904 may further be configured to carry out a base station identity code identification process for the selected plurality of mobile radio base stations. By way of example, the measurement device controller 904 may further be configured to carry out the base station identity code identification process while the second partial Received Signal Strength Indication measurement is carried out. In an implementation of various embodiments, the measurement device controller 904 may further be configured to carry out a GSM base station identity code identification process for the selected plurality of mobile radio base stations. In an implementation of various embodiments, the measurement device controller 904 may further be configured to carry out a base station identity code reconfirmation process for the selected plurality of mobile radio base stations for which the base station identity code identification process has been carried out. Moreover, the measurement device controller 904 may further be configured to carry out a GSM base station identity code reconfirmation process for the selected plurality of mobile radio base stations for which the base station identity code identification process has been carried out.

FIG. 12 shows a flow diagram 1200 illustrating a method for measuring Received Signal Strength Indication in accordance with an embodiment.

In various embodiments, the method may include, in 1202, carrying out a first partial Received Signal Strength Indication measurement for a multiplicity of mobile radio base stations, and, in 1204, selecting a plurality of mobile radio base station out of the multiplicity of mobile radio base stations based on the result of the first partial Received Signal Strength Indication measurement for a second partial Received Signal Strength Indication measurement. The method may further include, in 1206, carrying out the second partial Received Signal Strength Indication measurement for the selected plurality of mobile radio base stations.

In an implementation of this embodiment, the method may further include determining the multiplicity of mobile radio base stations from a mobile radio neighbor cell list. In another implementation of this embodiment, the method may further include receiving the mobile radio neighbor cell list via a mobile radio communication connection. In yet another implementation of this embodiment, the method may further include receiving the mobile radio neighbor cell list via a mobile radio communication connection from a mobile radio network device. In yet another implementation of this embodiment, at least one of the first partial Received Signal Strength Indication measurements and the second partial Received Signal Strength Indication measurements may be carried out during a mobile radio transmission gap. In yet another implementation of this embodiment, the first partial Received Signal Strength Indication measurement may include measuring the Received Signal Strength Indication for the multiplicity of mobile radio base stations only a predetermined number of time which is smaller than a predetermined number of times provided for the Received Signal Strength Indication measurement. In yet another implementation of this embodiment, the first partial Received Signal Strength Indication measurement may include measuring the Received Signal Strength Indication for the multiplicity of mobile radio base stations only once. In yet another implementation of this embodiment, the second partial Received Signal Strength Indication measurement may include measuring the Received Signal Strength Indication for the plurality of mobile radio base stations only twice. In yet another implementation of this embodiment, the method may further include carrying out base station identity code identification process for the selected plurality of mobile radio base stations. In yet another implementation of this embodiment, the base station identity code identification process may be carried out while the second partial Received Signal Strength Indication measurement is carried out. In yet another implementation of this embodiment, the method may further include selecting at least one mobile radio base station out of the plurality of mobile radio base stations based on the result of the second partial Received Signal Strength Indication measurement for a base station identity code identification process. In yet another implementation of this embodiment, the method may further include determining as to whether the at least one selected mobile radio base station out of the plurality of mobile radio base stations based on the result of the second partial Received Signal Strength Indication measurement is different from the selected plurality of mobile radio base stations out of the multiplicity of mobile radio base stations based on the result of the first partial Received Signal Strength Indication measurement, and in case the selected at least one mobile radio base station is different, stopping the base station identity code identification process for the selected plurality of mobile radio base stations, and starting a new base station identity code identification process for the selected at least one mobile radio base station based on the result of the second partial Received Signal Strength Indication measurement. In yet another implementation of this embodiment, the method may further include carrying out GSM base station identity code identification process for the selected plurality of mobile radio base stations. In yet another implementation of this embodiment, the method may further include carrying out base station identity code reconfirmation process for the selected plurality of mobile radio base stations for which the base station identity code identification process has been carried out. In yet another implementation of this embodiment, the method may further include carrying out a GSM base station identity code re-confirmation process for the selected plurality of mobile radio base stations for which the base station identity code identification process has been carried out. In yet another implementation of this embodiment, the method may further include determining a Received Signal Strength Indication measurement result based on the first partial Received Signal Strength Indication measurement and the second partial Received Signal Strength Indication measurement. In yet another implementation of this embodiment, the method may further include generating a Received Signal Strength Indication measurement report based on the Received Signal Strength Indication measurement result. In yet another implementation of this embodiment, the method may further include transmitting the Received Signal Strength Indication measurement report to a mobile radio network device. In yet another implementation of this embodiment, the selecting at least one mobile radio base station out of the plurality of mobile radio base stations may include selecting the mobile radio base station out of the plurality of mobile radio base stations which fulfills a predefined Received Signal Strength Indication receiving quality criterion for the Received Signal Strength Indication measured in the first partial Received Signal Strength Indication measurement.

In yet another embodiment, a measurement device for measuring Received Signal Strength Indication is provided. The measurement device may include a processor configured to carry out a method, which may include: carrying out a first partial Received Signal Strength Indication measurement for a plurality of mobile radio base stations, selecting at least one mobile radio base station out of the plurality of mobile radio base stations based on the result of the first partial Received Signal Strength Indication measurement for a second partial Received Signal Strength Indication measurement, and carrying out the second partial Received Signal Strength Indication measurement for the selected at least one mobile radio base station.

As already described above and as will be described in more detail below, in various embodiments, it is provided to not perform e.g. three times an RSSI measurement on all configured 2G mobile radio cells before the first strongest mobile radio cell is selected to start e.g. BSIC identification procedure or an RSSI measurement report may be sent back to a mobile radio network device.

In various embodiments, the time spent for an RSSI scan may be significantly shortened and the time until the first BSIC identification for a 2G mobile radio cell is started in dedicated mode may be accelerated. Therefore, a mobile radio communication terminal device (e.g. a UE) which requires compressed mode to perform 2G radio signal measurements will be ready to handover from a 3G mobile radio cell to a 2G mobile radio cell earlier compared to a conventional implementation and therefore, the risk of a dropped call may be reduced.

As an implementation example, the following numeric values will be described in the following: a typical compressed mode configuration may be as follows:

|  | GAP1 (RSSI) | GAP2 (BSIC IDENT) | GAP3 (BSIC RECONF) |
| --- | --- | --- | --- |
| tgprc | Infinite | Infinite | Infinite |
| tgsn | 4 | 4 | 4 |
| tdg | 270 | 270 | 270 |
| tgl1/tgl2 | 7 | 7 | 7 |
| tgpl1/tgpl2 | 8 | 8 | 8 |
| tg_cfn | n | n + 2 | n + 6 |

In a conventional method, the time for RSSI before FCB/SB search starts would be as follows:

| 8 | 250 ms |
| --- | --- |
| 16 | 570 ms |
| 24 | 890 ms |
| 32 | 1210 ms |

In a method in accordance with various embodiments, the time for RSSI before FCB/SB search starts may be as follows:

| 8 | 160 ms to 250 ms |
| --- | --- |
| 16 | 240 ms to 330 ms |
| 24 | 320 ms to 410 ms |
| 32 | 480 ms to 570 ms |

FIG. 13 shows a flow diagram 1300 illustrating a method for measuring Received Signal Strength Indication in accordance with yet another embodiment. In this embodiment, it is assumed that the mobile radio network only activates compressed mode transmission gaps (e.g. first transmission gap 410) for "GSM carrier RSSI measurements".

In various embodiments, in 1302, the mobile radio communication terminal device 122 (e.g. UE) starts the measuring of the RSSI of all configured 2G mobile radio cells (e.g. all 2G mobile radio cells included in the mobile radio neighbor cell list 604, 1004) using the compressed mode transmission gaps "GSM carrier RSSI measurements" (e.g. the first transmission gap 410). In this implementation, exactly one RSSI measurement sample is taken. However, in alternative implementations, it may be provided that a plurality of RSSI measurement samples are taken, but a number of RSSI measurement samples which is smaller than the number if RSSI measurement samples that are taken in the complete RSSI measurement process. This may be considered as an implementation of the first partial Received Signal Strength Indication measurement.

Furthermore, in 1304, after the one RSSI measurement sample has been taken from all configured 2G mobile radio cells, a 2G mobile radio cell measurement list (which may e.g. also be stored in the memory 602, 1002) may be sorted (in other words ranked) taking the RSSI measurement result as sorting criteria.

Then, in 1306, the mobile radio communication terminal device 122 (e.g. UE) may select a portion of all the configured 2G mobile radio cells (e.g. a predefined number which is smaller than the number of configured 2G mobile radio cells, e.g. six), for which the taken RSSI measurement samples show the strongest signal strength, and may collect the remaining RSSI measurement samples of the complete RSSI measurement process, (e.g. two more RSSI measurement samples) on the six "strongest" mobile radio cells using the assigned compressed mode transmission gap pattern. This may be considered as an implementation of the second partial Received Signal Strength Indication measurement.

Then, in 1308, after having completed the full RSSI measurement process (i.e. after having taken the remaining (e.g. two) RSSI measurement samples, the 2G mobile radio cell measurement list may be sorted again based on all the taken RSSI measurement samples (e.g. three) for the considered (e.g. six) 2G mobile radio cells for which the remaining (e.g. two) RSSI measurement samples have been taken in 1306.

Furthermore, in 1310, an RSSI measurement (including e.g. the sorted 2G mobile radio cell measurement list generated in 1308) may be generated and sent to the mobile radio network (e.g. to the mobile radio core network).

Then, in 1312, the RSSI measuring may be continued for all configured 2G mobile radio cells, e.g. by starting the method (i.e. the RSSI measurement process) again in 1302.

FIG. 14 shows a flow diagram 1400 illustrating a method for measuring Received Signal Strength Indication in accordance with yet another embodiment. In this embodiment, it is assumed that the mobile radio network only activates compressed mode transmission gaps (e.g. first transmission gap 410) for "GSM carrier RSSI measurements" and at least transmission gaps (e.g. second transmission gap 414) for "GSM initial BSIC identification".

In various embodiments, in 1402, the mobile radio communication terminal device 122 (e.g. UE) starts the measuring of the RSSI of all configured 2G mobile radio cells (e.g. all 2G mobile radio cells included in the mobile radio neighbor cell list 604, 1004) using the compressed mode transmission gaps "GSM carrier RSSI measurements" (e.g. the first transmission gap 410). In this implementation, exactly one RSSI measurement sample is taken. However, in alternative implementations, it may be provided that a plurality of RSSI measurement samples are taken, but a number of RSSI measurement samples which is smaller than the number if RSSI measurement samples that are taken in the complete RSSI measurement process. This may be considered as an implementation of the first partial Received Signal Strength Indication measurement.

Furthermore, in 1404, after the one RSSI measurement sample has been taken from all configured 2G mobile radio cells, a 2G mobile radio cell measurement list (which may e.g. also be stored in the memory 602, 1002) may be sorted (in other words ranked) taking the RSSI measurement result as sorting criteria.

Then, in 1406, the mobile radio communication terminal device 122 (e.g. UE) may select a portion of all the configured 2G mobile radio cells (e.g. a predefined number which is smaller than the number of configured 2G mobile radio cells, e.g. exactly one), for which the taken RSSI measurement sample(s) show(s) the strongest signal strength, and may start the BSIC identification procedure using the compressed mode transmission gaps with purpose "GSM initial BSIC identification" (e.g. the second transmission gaps 414).

In parallel (in other words, simultaneously), in 1408, the mobile radio communication terminal device 122 (e.g. UE) may collect the remaining RSSI measurement samples of the complete RSSI measurement process (e.g. two more RSSI measurement samples) on the six "strongest" mobile radio cells using the assigned compressed mode transmission gap pattern. This may be considered as an implementation of the second partial Received Signal Strength Indication measurement.

Then, in 1410, after having completed the fill RSSI measurement process (i.e. after having taken the remaining (e.g. two) RSSI measurement samples, the 2G mobile radio cell measurement list may be sorted again based on all the taken RSSI measurement samples (e.g. three) for the considered (e.g. six) 2G mobile radio cells for which the remaining (e.g. two) RSSI measurement samples have been taken in 1408.

In various implementations, if the 2G mobile radio cell the BSIC identification is currently ongoing (process 1406), is no longer the "strongest" mobile radio cell according to the re-sorting of the 2G mobile radio cell measurement list based on all the taken RSSI measurement samples (e.g. three) for the considered (e.g. six) 2G mobile radio cells for which the remaining (e.g. two) RSSI measurement samples have been taken in 1408, the BSIC identification process of that mobile radio cell (in other words, process 1406) may be aborted and a new BSIC identification procedure of the "new" strongest mobile radio cell may be started. In other words, in 1412, it may be determined as to whether the "strongest" mobile radio cell according to the re-sorted 2G mobile radio cell measurement list results in a new 2G mobile radio cell providing a higher signal strength according to the RSSI measurement process than the 2G mobile radio cell for which the previous BSIC identification process has already been started in 1406.

In case a new 2G mobile radio cell providing a higher signal strength according to the RSSI measurement process than the 2G mobile radio cell for which the previous BSIC identification process has already been started in 1406 is determined ("Yes" in 1412), the already ongoing BSIC identification process 1406 may be aborted (e.g. the frequency correction burst/synchronization burst (FCB/SB) search within the already ongoing BSIC identification process 1406 may be aborted) in 1414 and, in 1416, the mobile radio communication terminal device 122 (e.g. UE) may start the BSIC identification procedure using the compressed mode transmission gaps with purpose "GSM initial BSIC identification" (e.g. the second transmission gaps 414) for the new 2G mobile radio cell. Then, the method may continue in process 1420, which will be described in more detail below.

In a variation of this implementation, it may further be provided to determine as to whether the 2G mobile radio cell is a stronger mobile radio cell than the 2G mobile radio cell for which the previous BSIC identification process has already been started in 1406 and in case such a 2G mobile radio cell is determined, further to determine as to whether the RSSI measurement result for this determined 2G mobile radio cell is above a predefined RSSI measurement threshold value (which may be defined as an absolute value or a relative value referring to the taken RSSI measurement sample value of the 2G mobile radio cell for which the previous BSIC identification process has already been started in 1406), thereby ensuring that the determined 2G mobile radio cell will only be used as a new 2G mobile radio cell for processes 1414 and 1416 in case the new 2G mobile radio cell is sufficiently better with respect to the RSSI measurement than the previous 2G mobile radio cell. In case the RSSI measurement result for this determined 2G mobile radio cell is above the predefined RSSI measurement threshold value, in this variant, the determined 2G mobile radio cell is used as the new 2G mobile radio cell and the processes 1414 and 1416 are executed. However, in case the RSSI measurement result for this determined 2G mobile radio cell is not above the predefined RSSI measurement threshold value, the method will continue in process 1418 (in other words, the previous 2G mobile radio cell will not be "replaced" with respect to the BSIC identification process).

In case no new 2G mobile radio cell providing a higher signal strength according to the RSSI measurement process than the 2G mobile radio cell for which the previous BSIC identification process has already been started in 1406 is determined ("No" in 1412), the already ongoing BSIC identification process carried out on the previously selected mobile radio cell (in other words, process 1406) will continue in 1418.

Then, in 1420, the mobile radio communication terminal device 122 (e.g. UE) may revert back to normal RSSI measurement mode and may continuously perform RSSI measurements on all configured 2G mobile radio cells.

After having completed the respective BSIC identification process (in other words, as soon as the BSIC of the strongest mobile radio cell is identified), in 1422, a BSIC measurement report may be generated and sent to the mobile radio network (e.g. the mobile radio core network).

Then, in an implementation, in 1424, the mobile radio communication terminal device 122 (e.g. UE) may identify the BSIC for the other mobile radio cells and if a compressed mode transmission gap pattern with purpose "GSM BSIC re-confirmation" is activated, in 1426, the BSIC verification procedure may be started for all mobile radio cells with known (in other words determined) BSIC.

As described above, in various embodiments, the mobile radio communication terminal device 122 (e.g. UE) measures the RSSI once for all mobile radio cells of the 2G neighbor cell list. Already after the result of the first RSSI scan is available, the results may be sorted. If compressed mode transmission gap patterns with purpose "GSM initial BSIC identification" are configured, the mobile radio communication terminal device 122 (e.g. UE) may take the strongest mobile radio cell and may start BSIC identification.

Then, in various embodiments, the mobile radio communication terminal device 122 (e.g. UE) may continue to measure the missing 2 RSSI samples only on the predefined number of e.g. 6 strongest carriers. If no compressed mode transmission gaps with "GSM initial BSIC identification" are configured, the mobile radio communication terminal device 122 (e.g. UE) may send the RSSI measurement result back to the mobile radio network.

Otherwise, if the strongest mobile radio cell has changed within the set of the predefined number of e.g. 6 strongest mobile radio cells, then the currently ongoing BSIC identification may be aborted and a new BSIC identification for the new strongest mobile radio cell may be started.

After all (e.g. three) RSSI samples are available for the predefined number of e.g. 6 strongest mobile radio cells, the mobile radio communication terminal device 122 (e.g. UE) may revert back to normal RSSI measurement mode and may measure the RSSI of all mobile radio cells of the 2G mobile radio cell list.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for measuring Received Signal Strength Indication, the method comprising:
   carrying out a first partial Received Signal Strength Indication measurement for a plurality of mobile radio base stations;
   selecting at least one first mobile radio base station out of the plurality of mobile radio base stations based on the result of the first partial Received Signal Strength Indication measurement for a second partial Received Signal Strength Indication measurement;
   carrying out the second partial Received Signal Strength Indication measurement for the selected at least one first mobile radio base station;
   selecting at least one mobile second radio base station out of the plurality of mobile radio base stations based on the result of the second partial Received Signal Strength Indication measurement for a base station identity code identification process;
   determining as to whether the selected at least one first mobile radio base station out of the plurality of mobile radio base stations based on the result of the first partial Received Signal Strength Indication measurement is different from the selected at least one second mobile radio base station out of the plurality of mobile radio base stations based on the result of the second partial Received Signal Strength Indication measurement; and
   in case the selected at least one mobile radio base stations are different, stopping the base station identity code identification process for the selected at least one mobile radio base station, and starting a new base station identity code identification process for the selected at least one second mobile radio base station based on the result of the second partial Received Signal Strength Indication measurement.

2. The method of claim 1, further comprising:
   determining the plurality of mobile radio base stations from a mobile radio neighbor cell list.

3. The method of claim 2, further comprising:
   receiving the mobile radio neighbor cell list via a mobile radio communication connection.

4. The method of claim 1, wherein at least one of the first partial Received Signal Strength Indication measurements and the second partial Received Signal Strength Indication measurements are carried out during a mobile radio transmission gap.

5. The method of claim 1, wherein the first partial Received Signal Strength Indication measurement comprises measuring the Received Signal Strength Indication for the plurality of mobile radio base stations only a predetermined number of time which is smaller than a predetermined number of times provided for the Received Signal Strength Indication measurement.

6. The method of claim 5, wherein the first partial Received Signal Strength Indication measurement comprises measuring the Received Signal Strength Indication for the plurality of mobile radio base stations only once.

7. The method of claim 1, further comprising:
   carrying out base station identity code identification process for the selected at least one mobile radio base station.

8. The method of claim 7, wherein the base station identity code identification process is carried out while the second partial Received Signal Strength Indication measurement is carried out.

9. The method of claim 7, further comprising:
   carrying out base station identity code re-confirmation process for the selected at least one mobile radio base station for which the base station identity code identification process has been carried out.

10. The method of claim 1, further comprising:
    carrying out GSM base station identity code identification process for the selected at least one mobile radio base station.

11. The method of claim 1, further comprising:
    determining a Received Signal Strength Indication measurement result based on the first partial Received Signal Strength Indication measurement and the second partial Received Signal Strength Indication measurement.

12. The method of claim 11, further comprising:
    generating a Received Signal Strength Indication measurement report based on the Received Signal Strength Indication measurement result.

13. A measurement device for measuring Received Signal Strength Indication, the measurement device comprising:
    a measurement device controller configured to carry out a first partial Received Signal Strength Indication measurement for a plurality of mobile radio base stations;
    a selector configured to select at least one first mobile radio base station out of the plurality of mobile radio base stations based on the result of the first partial Received Signal Strength Indication measurement for a second partial Received Signal Strength Indication measurement;
    wherein the measurement device controller is further configured to carry out the second partial Received Signal Strength Indication measurement for the selected at least one first mobile radio base station;
    a further selector configured to select at least one second mobile radio base station out of the plurality of mobile radio base stations based on the result of the second partial Received Signal Strength Indication measurement for a base station identity code identification process;
    a first determination circuit configured to determine as to whether the selected at least one first mobile radio base station out of the plurality of mobile radio base stations based on the result of the first partial Received Signal Strength Indication measurement is different from the selected at least one second mobile radio base station out of the plurality of mobile radio base stations based on the result of the second partial Received Signal Strength Indication measurement; and
    wherein the measurement device controller is further configured, in case the selected at least one mobile radio base stations are different, to stop the base station identity code identification process for the selected at least one first mobile radio base station, and to start a new base station identity code identification process for the selected at least one second mobile radio base station based on the result of the second partial Received Signal Strength Indication measurement.

14. The measurement device of claim 13, wherein the measurement device controller is further configured to carry out at least one of the first partial Received Signal Strength 15. A radio communication device, comprising:
- a measurement device for measuring Received Signal Strength Indication, the measurement device comprising:
- a measurement device controller configured to carry out a first partial Received Signal Strength Indication measurement for a plurality of mobile radio base stations;
- a selector configured to select at least one it mobile radio base station out of the plurality of mobile radio base stations based on the result of the first partial Received Signal Strength Indication measurement for a second partial Received Signal Strength Indication measurement;
- wherein the measurement device controller is further configured to carry out the second partial Received Signal Strength Indication measurement for the selected at least one first mobile radio base station;
- a further selector configured to select at least one second mobile radio base station out of the plurality of mobile radio base stations based on the result of the second partial Received Signal Strength Indication measurement for a base station identity code identification process;
- a first determination circuit configured to determine as to whether the selected at least one first mobile radio base station out of the plurality of mobile radio base stations based on the result of the first partial Received Signal Strength Indication measurement is different from the selected at least one second mobile radio base station out of the plurality of mobile radio base stations based on the result of the second partial Received Signal Strength Indication measurement; and
- wherein the measurement device controller is further configured, in case the selected at least one mobile radio base stations are different, to stop the base station identity code identification process for the selected at least one first mobile radio base station, and to start a new base station identity code identification process for the selected at least one second mobile radio base station based on the result of the second partial Received Signal Strength Indication measurement.

16. The radio communication device of claim 15, further comprising:
- a memory to store a mobile radio neighbor cell list;
- wherein the measurement device controller is further configured to determine the plurality of mobile radio base stations from the mobile radio neighbor cell list.

17. The radio communication device of claim 16, further comprising:
- a receiver configured to receive the mobile radio neighbor cell list via a mobile radio communication connection.

18. A method for measuring Received Signal Strength Indication, the method comprising:
- carrying out a first partial Received Signal Strength Indication measurement for a multiplicity of mobile radio base stations;
- selecting a plurality of mobile radio base station out of the multiplicity of mobile radio base stations based on the result of the first partial Received Signal Strength Indication measurement for a second partial Received Signal Strength Indication measurement;
- carrying out the second partial Received Signal Strength Indication measurement for the selected plurality of mobile radio base stations;
- selecting at least one mobile radio base station out of the plurality of mobile radio base stations based on the result of the second partial Received Signal Strength Indication measurement for a base station identity code identification process;
- determining as to whether the at least one selected mobile radio base station out of the plurality of mobile radio base stations based on the result of the second partial Received Signal Strength Indication measurement is different from the selected plurality of mobile radio base stations out of the multiplicity of mobile radio base stations based on the result of the first partial Received Signal Strength Indication measurement; and
- in case the selected at least one mobile radio base station is different, stopping the base station identity code identification process for the selected plurality of mobile radio base stations, and starting a new base station identity code identification process for the selected at least one mobile radio base station based on the result of the second partial Received Signal Strength Indication measurement.

19. A measurement device for measuring Received Signal Strength Indication, the measurement device comprising:
- a measurement device controller configured to carry out a first partial Received Signal Strength Indication measurement for a multiplicity of mobile radio base stations;
- a selector configured to select a plurality of mobile radio base stations out of the multiplicity of mobile radio base stations based on the result of the first partial Received Signal Strength Indication measurement for a second partial Received Signal Strength Indication measurement;
- wherein the measurement device controller is further configured to carry out the second partial Received Signal Strength Indication measurement for the selected plurality of mobile radio base stations;
- a further selector configured to select at least one mobile radio base station out of the plurality of mobile radio base stations based on the result of the second partial Received Signal Strength Indication measurement for a base station identity code identification process;
- a first determination circuit configured to determine as to whether the at least one selected mobile radio base station out of the plurality of mobile radio base stations based on the result of the second partial Received Signal Strength Indication measurement is different from the selected plurality of mobile radio base stations out of the multiplicity of mobile radio base stations based on the result of the first partial Received Signal Strength Indication measurement; and
- wherein the measurement device controller is further configured, in case the selected at least one mobile radio base station is different, stopping the base station identity code identification process for the selected plurality of mobile radio base stations, and starting a new base station identity code identification process for the selected at least one mobile radio base station based on the result of the second partial Received Signal Strength Indication measurement.

20. The measurement device of claim 19, wherein the measurement device controller is further configured to carry out at least one of the first partial Received Signal Strength Indication measurements and the second partial Received Signal Strength Indication measurements during a mobile radio transmission gap.

* * * * *